(12) United States Patent
Lull et al.

(10) Patent No.: US 6,962,164 B2
(45) Date of Patent: Nov. 8, 2005

(54) SYSTEM AND METHOD FOR A MASS FLOW CONTROLLER

(75) Inventors: John M. Lull, Claremont, CA (US); Chiun Wang, Cerritos, CA (US); William S. Valentine, Irvine, CA (US); Joseph A. Saggio, Jr., Anaheim Hills, CA (US)

(73) Assignee: Celerity Group, Inc., Santa Clara, CA (US)

( * ) Notice: Subject to any disclaimer, the term of this patent is extended or adjusted under 35 U.S.C. 154(b) by 66 days.

(21) Appl. No.: 10/131,603

(22) Filed: Apr. 24, 2002

(65) Prior Publication Data

US 2002/0198668 A1 Dec. 26, 2002

Related U.S. Application Data

(60) Provisional application No. 60/285,801, filed on Apr. 24, 2001.

(51) Int. Cl.[7] .............................. G05D 7/06; G01F 25/00
(52) U.S. Cl. ......................... 137/2; 137/486; 137/487.5; 700/29; 700/37; 700/282; 702/45; 702/100
(58) Field of Search ........................... 700/29, 37, 282; 137/1, 487.5; 702/45, 50, 100; 73/1.16, 1.25

(56) References Cited

U.S. PATENT DOCUMENTS

| | | | |
|---|---|---|---|
| 3,532,862 A | 10/1970 | Dahlin | |
| 3,671,725 A | 6/1972 | Bakke | |
| 3,786,492 A | 1/1974 | Carleton | |
| 4,253,480 A | 3/1981 | Kessel et al. | |
| 4,434,933 A | 3/1984 | Tamura | |
| 4,658,855 A | * 4/1987 | Doyle | 137/468 |
| 4,672,997 A | 6/1987 | Landis et al. | |
| 4,679,585 A | 7/1987 | Ewing | |
| 4,877,051 A | 10/1989 | Day | |
| 4,928,048 A | 5/1990 | Doyle | |
| 4,938,658 A | 7/1990 | Blotenberg | |
| 4,947,889 A | 8/1990 | Ishikawa et al. | |
| 5,048,332 A | 9/1991 | Ishikawa et al. | |
| 5,062,446 A | 11/1991 | Anderson | |
| 5,100,100 A | 3/1992 | Benson et al. | |
| 5,107,441 A | 4/1992 | Decker | |
| 5,129,418 A | 7/1992 | Shimomura et al. | |
| 5,141,021 A | 8/1992 | Shimomura et al. | |
| 5,222,417 A | 6/1993 | Sato | |
| 5,249,117 A | 9/1993 | Greenough et al. | |

(Continued)

FOREIGN PATENT DOCUMENTS

| | | |
|---|---|---|
| EP | 0 110 325 A1 | 6/1984 |
| EP | 0 281 947 A2 | 9/1988 |

(Continued)

OTHER PUBLICATIONS

International Search Report from International Patent Application No. PCT/US02/13010, filed Apr. 24, 2002.
International Search Report from International Patent Applicaiton No. PCT/US02/13010, filed Apr. 24, 2002.
Tison S.A.: "Accurate Flow Measurement In Vacuum Processing" Solid State Technology, Cowan Publ. Corp. Washington, US, vol. 39, No. 10, Oct. 1, 1996, pp. 73–74, 78, 80, 83.

Primary Examiner—Ramesh Krishnamurthy
(74) Attorney, Agent, or Firm—Lowrie, Lando & Anastasi, LLP

(57) ABSTRACT

A system and method for controlling a mass flow controller to have a constant control loop gain under a variety of different types of fluids and operating conditions, and for configuring the mass flow controller for operation with a fluid and/or operating conditions different from that used during a production of the mass flow controller. Further, the system and method includes providing control by reducing the effects of hysteresis in solenoid actuated devices by providing a non-operational signal to the solenoid actuated device.

28 Claims, 17 Drawing Sheets

U.S. PATENT DOCUMENTS

| | | |
|---|---|---|
| 5,279,154 A | 1/1994 | Vavra et al. |
| 5,357,811 A | 10/1994 | Hoang |
| 5,394,755 A | 3/1995 | Sudo et al. |
| 5,441,076 A | 8/1995 | Moriya et al. |
| 5,445,035 A | 8/1995 | Delajoud |
| 5,524,084 A | 6/1996 | Wang et al. |
| 5,605,178 A | 2/1997 | Jennins |
| 5,660,207 A | 8/1997 | Mudd |
| 5,662,143 A | 9/1997 | Caughran |
| 5,669,408 A | 9/1997 | Nishino et al. |
| 5,684,245 A | 11/1997 | Hinkle |
| 5,765,283 A | 6/1998 | Mudd |
| 5,791,369 A | 8/1998 | Nishino et al. |
| 5,816,285 A | 10/1998 | Ohmi et al. |
| 5,850,850 A | 12/1998 | Mudd |
| 5,865,205 A | 2/1999 | Wilmer |
| 5,868,159 A | 2/1999 | Loan et al. |
| 5,878,765 A | 3/1999 | Lange |
| 5,911,238 A | 6/1999 | Bump et al. |
| 5,944,048 A | 8/1999 | Bump et al. |
| 5,950,668 A * | 9/1999 | Baumann .................. 137/487.5 |
| 5,975,126 A | 11/1999 | Bump et al. |
| 5,988,217 A | 11/1999 | Ohmi et al. |
| 6,044,701 A | 4/2000 | Doyle et al. |
| 6,074,691 A * | 6/2000 | Schmitt et al. ................. 427/8 |
| 6,128,541 A | 10/2000 | Junk |
| 6,138,708 A | 10/2000 | Waldbusser |
| 6,142,163 A * | 11/2000 | McMillin et al. ............... 137/14 |
| 6,152,168 A | 11/2000 | Ohmi et al. |
| 6,155,283 A | 12/2000 | Hansen et al. |
| 6,158,679 A | 12/2000 | Ohmi et al. |
| 6,178,995 B1 | 1/2001 | Ohmi et al. |
| 6,216,726 B1 | 4/2001 | Brown et al. |
| 6,217,506 B1 | 4/2001 | Phillips et al. |
| 6,289,923 B1 | 9/2001 | Ohmi et al. |
| 6,302,130 B1 | 10/2001 | Ohmi et al. |
| 6,314,992 B1 | 11/2001 | Ohmi et al. |
| 6,343,617 B1 | 2/2002 | Tinsley et al. |
| 6,389,364 B1 | 5/2002 | Vyers |
| 6,404,612 B1 | 6/2002 | Pattantyus |
| 6,445,980 B1 | 9/2002 | Vyers |
| 6,449,571 B1 | 9/2002 | Tarig et al. |
| 6,450,190 B2 | 9/2002 | Ohmi et al. |
| 6,561,218 B2 | 5/2003 | Mudd |
| 6,631,334 B2 | 10/2003 | Grosshart |
| 6,640,822 B2 | 11/2003 | Tinsley et al. |
| 2004/0074311 A1 | 4/2004 | Lull et al. |
| 2004/0204885 A1 | 10/2004 | Wang et al. |

FOREIGN PATENT DOCUMENTS

| | | |
|---|---|---|
| EP | 0 834 723 A1 | 4/1998 |
| EP | 0 890 828 A1 | 1/1999 |
| WO | WO 97/11297 A1 | 3/1997 |
| WO | WO 01/04580 A2 | 1/2001 |
| WO | WO 01/04582 A1 | 1/2001 |
| WO | WO 01/04715 A1 | 1/2001 |
| WO | WO 01/04716 A1 | 1/2001 |
| WO | WO 01/04717 A1 | 1/2001 |
| WO | WO 01/04923 A1 | 1/2001 |

* cited by examiner

SYSTEM AND METHOD FOR A MASS FLOW CONTROLLER

This application claims priority under 35 U.S.C. §119 (e) to U.S. provisional patent application Ser. No. 60/285,801, entitled "SYSTEM AND METHOD FOR A MASS FLOW CONTROLLER," filed Apr. 24, 2001, which is incorporated herein by reference in its entirety.

FIELD OF THE INVENTION

The present invention relates generally to a method and system for controlling the flow rate of a fluid, and more particularly to a mass flow controller that can be configured for use with arbitrary process fluids and/or process operating conditions that may differ from those used during production of the mass flow controller.

BACKGROUND OF THE INVENTION

Many industrial processes require precise control of various process fluids. For example, in the pharmaceutical and semiconductor industries, mass flow controllers are used to precisely measure and control the amount of a process fluid that is introduced to a process chamber. The term fluid is used herein to describe any type of matter in any state that is capable of flow. It is to be understood that the term fluid applies to liquids, gases, and slurries comprising any combination of matter or substance to which controlled flow may be of interest.

Conventional mass flow controllers generally include four main portions: a flow meter, a control valve, a valve actuator, and a controller. The flow meter measures the mass flow rate of a fluid in a flow path and provides a signal indicative of that flow rate. The flow meter may include a mass flow sensor and a bypass. The mass flow sensor measures the mass flow rate of fluid in a sensor conduit that is fluidly coupled to the bypass. The mass flow rate of fluid in the sensor conduit is approximately proportional to the mass flow rate of fluid flowing in the bypass, with the sum of the two being the total flow rate through the flow path controlled by the mass flow controller. However, it should be appreciated that some mass flow controllers may not employ a bypass, as such, all of the fluid may flow through the sensor conduit.

In many mass flow controllers, a thermal mass flow sensor is used that includes a pair of resistors that are wound about the sensor conduit at spaced apart positions, each having a resistance that varies with temperature. As fluid flows through the sensor conduit, heat is carried from the upstream resistor toward the downstream resistor, with the temperature difference being proportional to the mass flow rate of the fluid flowing through the sensor conduit and the bypass.

A control valve is positioned in the main fluid flow path (typically downstream of the bypass and mass flow sensor) and can be controlled (e.g., opened or closed) to vary the mass flow rate of fluid flowing through the main fluid flow path and provided by the mass flow controller. The valve is typically controlled by a valve actuator, examples of which include solenoid actuators, piezoelectric actuators, stepper actuators, etc.

Control electronics control the position of the control valve based upon a set point indicative of the mass flow rate of fluid that is desired to be provided by the mass flow controller, and a flow signal from the mass flow sensor indicative of the actual mass flow rate of the fluid flowing in the sensor conduit. Traditional feedback control methods such as proportional control, integral control, proportional-integral (PI) control, derivative control, proportional-derivative (PD) control, integral-derivative (ID) control, and proportional-integral-derivative (PID) control are then used to control the flow of fluid in the mass flow controller. In each of the aforementioned feedback control methods, a control signal (e.g., a control valve drive signal) is generated based upon an error signal that is the difference between a set point signal indicative of the desired mass flow rate of the fluid and a feedback signal that is related to the actual mass flow rate sensed by the mass flow sensor.

Many conventional mass flow controllers are sensitive to component behavior that may be dependent upon any of a number of operating conditions including fluid species, flow rate, inlet and/or outlet pressure, temperature, etc. In addition, conventional mass flow controllers may exhibit certain non-uniformities particular to a combination of components used in the production of the mass flow controller which can result in inconsistent and undesirable performance of the mass flow controller.

To combat some of these problems, a mass flow controller may be tuned and/or calibrated during production. Production generally includes operating the mass flow controller on a test fluid under a set of operating conditions and tuning and/or calibrating the mass flow controller so that it exhibits satisfactory behavior.

As known to those skilled in the art, the tuning and/or calibration of a mass flow controller is an expensive, labor intensive procedure, often requiring one or more skilled operators and specialized equipment. For example, the mass flow sensor portion of the mass flow controller may be tuned by running known amounts of a known fluid through the sensor portion and adjusting certain filters or components to provide an appropriate response. A bypass may then be mounted to the sensor, and the bypass tuned with the known fluid to reflect an appropriate percentage of the fluid flowing in the main fluid flow path at various known flow rates. The mass flow sensor portion and bypass may then be mated to the control valve and control electronics portions and then tuned again, under known conditions.

When the type of fluid used by an end-user differs from that used in tuning and/or calibration, or when the operating conditions, such as inlet and outlet pressure, temperature, range of flow rates, etc., used by the end-user differ from that used in tuning and/or calibration, the operation of the mass flow controller can be expected to degrade. For this reason, additional fluids (termed "surrogate fluids") and or operating conditions are often tuned or calibrated, with any changes necessary to provide a satisfactory response being stored in a lookup table.

Although the use of additional tuning and/or calibration with different fluids and at different operating conditions can be used to improve the performance of the mass flow controller, this type of surrogate tuning and/or calibration is time consuming and expensive, as the tuning and/or calibration procedures must be repeated for at least each surrogate fluid and likely must be repeated for a number of different operating conditions with each surrogate fluid. Furthermore, because the surrogate fluids only approximate the behavior of the various types of fluids that may be used by the end-user, the actual operation of the mass flow controller at an end-user site may differ substantially from that during tuning and/or calibration. Considering the wide range of industries and applications employing mass flow controllers, the process fluid and operating conditions applied to the mass flow controller by an end user are likely to be different than the test fluids and operating conditions upon which a mass flow controller was tuned and/or calibrated, despite tuning and/or calibration of the mass flow controller with a number of different surrogate fluids and operating conditions.

In addition to the foregoing external factors (e.g., fluid species, flow rate, inlet and/or outlet pressure, temperature, etc.) that may affect the performance and response of a mass flow controller, factors associated with the physical operation of a mass flow controller may also contribute to the overall sensitivity of the mass flow controller to external factors and changing conditions. For example, many valves employed to control flow in mass flow controllers are solenoid actuated devices.

Although a number of manufacturers of mass flow controllers utilize piezoelectric actuators, solenoid actuators are generally preferred due to their simplicity, their quick response, and their low cost. Nonetheless, solenoid actuated control valves do have certain drawbacks, with one of the more significant drawbacks of solenoid actuated control valves (and solenoid actuated devices in general) being that they exhibit hysteresis. Hysteresis is a well known phenomenon common to many apparatus employing magnetics or electromagnetics or magnetic material. In general, hysteresis applies to a lagging or retardation in the values of resulting magnetization due to a changing magnetizing force. In many solenoid actuated devices, this results in a condition wherein the operation of the device depends not only upon a present state of the device, but also upon a prior state.

It is commonly understood that solenoid actuated control valves exhibit hysteresis. It is also commonly understood that this hysteresis adversely impacts the consistency of a valve with respect to transitioning between states of no flow and controlled flow in a mass flow controller. Nonetheless, in conventional mass flow controller design, this drawback has typically been accepted as a necessary drawback of using a solenoid actuated control valve, which, for many manufacturers, is outweighed by the advantages of solenoid actuated control valve, such as simplicity, cost, and reliability.

SUMMARY OF THE INVENTION

According to one embodiment of the present invention, a method of configuring a mass flow controller for operation with process operating conditions that differ at least in part from test operating conditions used during production of the mass flow controller is provided. The method comprises acts of establishing a response of the mass flow controller with the test operating conditions, and modifying at least one control parameter of the mass flow controller based on the process operating conditions such that the response of the mass flow controller operating with the process operating conditions does not substantially change.

Another embodiment of the present invention includes a computer readable medium encoded with a program for execution on a processor, the program, when executed on the processor performing a method of configuring a mass flow controller for operation with a set of process operating conditions that differ at least in part from a set of test operating conditions used to establish a response of the mass flow controller during production. The method comprises acts of receiving as an input at least one of process fluid species information and process operating conditions, and modifying at least one control parameter of the mass flow controller based on the input such that the response of the mass flow controller does not substantially change when operated with the process operating conditions.

According to another embodiment of the present invention a method for configuring a mass flow controller having a first response when used with a first set of operating conditions and having a second response, substantially different than the first response, when used with a second set of operating conditions before configuration is provided. The method comprises act of operating the mass flow controller with the first set of operating conditions, obtaining configuration data from the mass flow controller during the act of operating, setting at least one control parameter of the mass flow controller based upon the configuration data to provide the first response with the first set of operating conditions, and modifying at least one control parameter based at least in part on the configuration data to provide the first response with the second set of operating conditions.

According to another embodiment of the present invention a method for configuring a mass flow controller having a control loop that includes a flow meter that monitors an actual flow of fluid provided by the mass flow controller and provides a conditioned output signal, the flow meter having a first gain term, a control section that receives a second input signal indicative of a desired flow of the fluid to be provided by the mass flow controller and provides a control signal, the control section having a second gain term that is a function of at least one variable operating condition, a valve that permits fluid flow based on the displacement of one or more elements of the valve, the valve having a third gain term, and a valve actuator that receives the control signal and adjusts the displacement of one or more elements in the valve, the valve actuator having a fourth gain term to have a substantially constant control loop gain is provided. The method comprises acts of determining the first, third, and fourth gain terms with a first fluid using a first set of operating conditions, predicting how the first, third, and fourth gain terms will change with at least one of a second fluid and a second set of operating conditions, and changing the second gain term to a constant times the reciprocal of the product of the first, third and fourth gain terms to provide the substantially constant control loop gain with respect to at least the at least one variable operating condition.

According to another embodiment of the present invention a method of controlling a mass flow controller having a plurality of components defining a control loop of the mass flow controller is provided. The method of comprises acts of forming at least one control loop control parameter that is a function of at least one variable operating condition, and maintaining a constant loop gain of the control loop with respect to at least the at least one variable operating condition by applying the at least one control loop control parameter to the control loop of the mass flow controller.

Another embodiment of the present invention includes a mass flow controller comprising a flow meter adapted to sense fluid flow in a flow path and provide a flow signal indicative of the mass flow rate in the flow path, a controller coupled to the flow meter for providing a drive signal based at least in part on the flow signal, a valve actuator to receive the drive signal from the controller, and a valve controlled by the valve actuator and coupled to fluid path. The mass flow controller further comprises a control loop of the mass flow controller having a constant closed loop gain.

Another embodiment of the present invention includes a mass flow controller having a control loop, the mass flow controller comprising a flow meter adapted to sense fluid flow in a fluid flow path and provide a flow signal indicative of the mass flow rate in the flow path, a controller coupled to the flow meter and adapted to provide a drive signal based at least in part on the flow signal, a valve actuator adapted to receive the drive signal from the controller, a valve adapted to be controlled by the valve actuator and coupled to the fluid flow path, wherein the control loop of the mass flow controller includes the flow meter, the controller, the valve actuator, and the valve, and wherein the control loop is adapted to have a substantially constant control loop gain term with respect to at least one variable operating condition during operation.

According to another embodiment of the present invention, a mass flow controller is provided. The mass flow controller comprises a flow meter, having a first gain term, to sense a mass flow rate of a fluid in a flow path of the mass flow controller and provide a flow signal indicative of the mass flow rate of the fluid in the flow path, a valve, having a second gain term, to receive a control signal that controls the mass flow rate of the fluid in the flow path, a valve actuator, having a third gain term, to receive a drive signal and provide the control signal to the valve, and a controller. The controller has a first input to receive the flow signal, a second input to receive a set point signal indicative of a desired mass flow rate of the fluid, and an output that provides the drive signal to the valve actuator. The controller is adapted to provide a reciprocal gain term formed by taking a reciprocal of a product of at least one of the first gain term, the second gain term, and the third gain term.

According to another aspect of the present invention, a method of determining a displacement of a valve having a valve inlet to receive a flow of fluid at an inlet pressure and a valve outlet to provide the flow of fluid at an outlet pressure is provided. The method comprises acts of selecting an intermediate pressure between the inlet pressure and the outlet pressure, determining a first displacement of the valve based upon a viscous pressure drop from the inlet pressure to the intermediate pressure, determining a second displacement of the valve based upon an inviscid pressure drop from the intermediate pressure to the outlet pressure, determining whether the first displacement is approximately equal to the second displacement, and selecting one of the first displacement and the second displacement as the displacement of the valve when the first displacement is approximately equal to the second displacement.

According to another aspect of the present invention, a method of reducing the effects of hysteresis in a solenoid actuated device is provided. In one embodiment, the method comprises an act of applying a predetermined non-operational signal to the solenoid actuated device to place the device in a predetermined state.

According to another embodiment, the method of operating the solenoid actuated device, comprises acts of (a) providing a first amount of energy to the solenoid actuated device to move the solenoid actuated device from a first position to a second position, (b) providing a second amount of energy to the solenoid actuated device to return the solenoid actuated device to the first position, and (c) setting the solenoid actuated device to a predetermined state after the act (b) when the first amount of energy exceeds a predetermined amount of energy.

According to another embodiment of the present invention, an apparatus is provided comprising a solenoid actuated device, and a solenoid actuator that is coupled to the solenoid actuated device. The actuator is adapted to provide a non-operational signal to the solenoid actuated device to set the device to a predetermined state.

According to another embodiment of the present invention, a method of configuring a mass flow controller for operation with a set of process operating conditions that differ at least in part from a set of test operating conditions used to establish a first response of the mass flow controller during production is provided. The method comprises acts of characterizing the mass flow controller with the first set of operating conditions, obtaining configuration data during the act of characterizing, and modifying at least one control parameter based on the configuration data and the process operating conditions such that the response of the mass flow controller does not substantially change.

According to another aspect of present invention, a spline may be used to form a linearization curve that linearizes an output signal of a mass flow meter. According to one embodiment, a cubic spline may be used to define a transfer function of the mass flow meter. According to another embodiment, a cubic spline may be fitted to an inverse of a transfer function of the mass flow meter.

Various advantages, novel features, and objects of the invention will become apparent from the following detailed description of the invention when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure, nor is every component of each embodiment of the invention shown where illustration is not necessary to allow those of ordinary skill in the art to understand the invention.

DETAILED DESCRIPTION OF THE INVENTION

Figure 1:
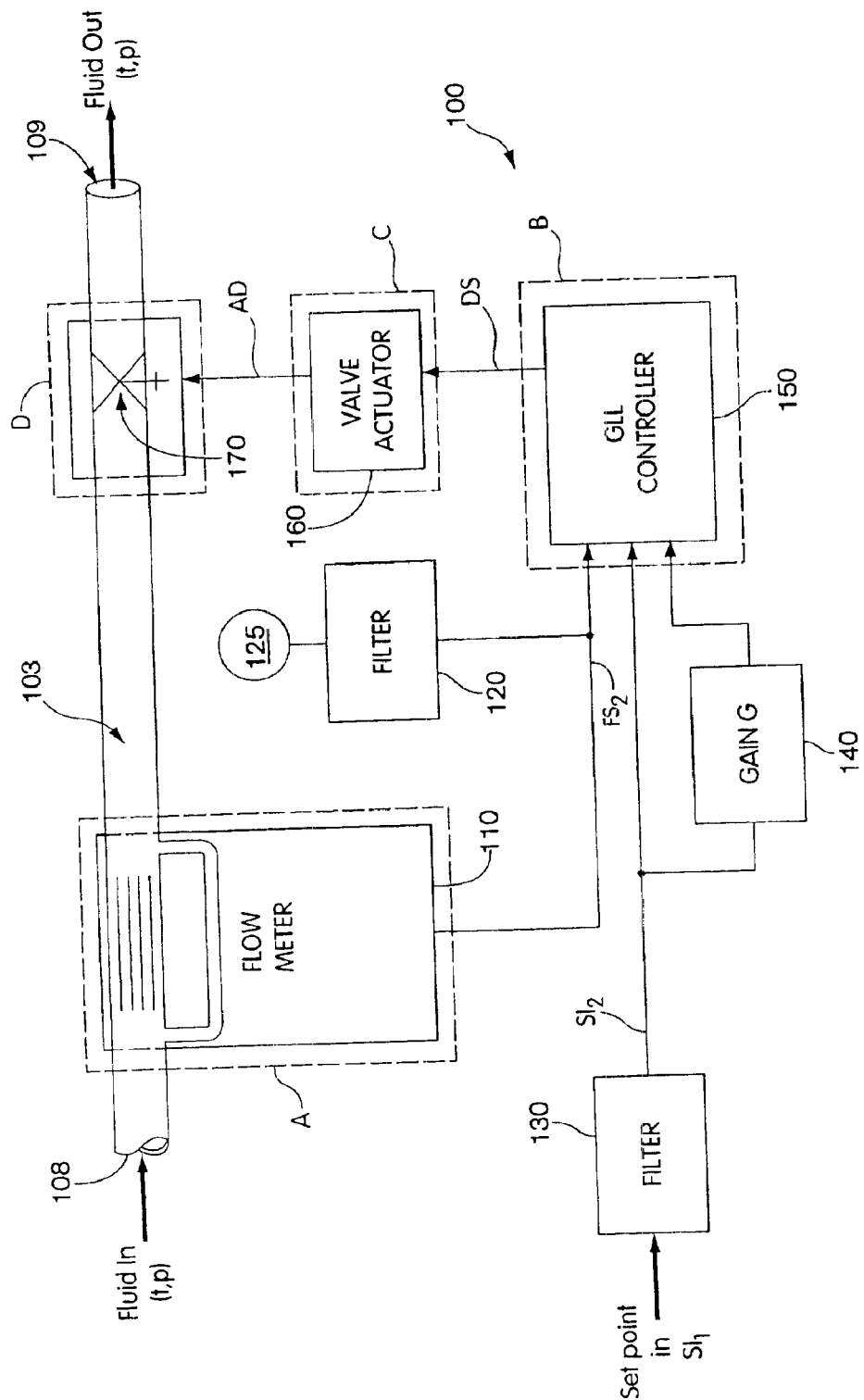
FIG. 1 illustrates a schematic block diagram of a mass flow controller according to an embodiment of the present invention that may be used with a variety of different fluids and in a variety of different operating conditions.

Mass flow controllers are often vulnerable to instability due to factors ranging from non-linearities in the various components of the mass flow controller and/or dependencies on various operating conditions of a mass flow controller. The term operating condition applies generally to any of various conditions that can be controlled and that may influence the operation of a mass flow controller. In particular, operating conditions apply to various external conditions that can be controlled independent of a particular mass flow controller. Exemplary operating conditions include, but are not limited to, fluid species, set point or flow rate, inlet and/or outlet pressure, temperature, etc.

However, it should be appreciated that other internal conditions may be present during the operation of a mass flow controller such as signal characteristics, system noise, or perturbations that cannot be controlled independent of a particular flow controller. In particular, various signals employed by the mass flow controller may have frequency components containing many different frequencies. However, the frequency composition of a signal is inherent to the signal and is not considered to be controllable independent of a particular mass flow controller. Accordingly, such conditions, unless specifically stated otherwise, are not considered to be encompassed within the term operating conditions in this disclosure.

The term mass flow rate, fluid flow, and flow rate will be used interchangeably herein to describe the amount of fluid flowing through a unit volume of a flow path (e.g. flow path 103 of FIG. 1), or a portion of the flow path, per unit time (i.e., fluid mass flux).

The term species applies generally to the properties of a specific instance of a fluid. A change in species may include a change in fluid type (e.g., from nitrogen to hydrogen), a change in the composition of a fluid (e.g., if the fluid is a combination of gases or liquids, etc.), and/or a change in the state of the fluid or combination of fluids. In particular, a change in species applies to a change in at least one property of a fluid that may change or affect the performance of a mass flow controller. The term species information applies generally to any number of properties that define a particular fluid species. For example, species information may include, but is not limited to, fluid type (e.g. hydrogen, nitrogen, etc.), fluid composition (e.g., hydrogen and nitrogen), molecular weight, specific heat, state (e.g., liquid, gas, etc.), viscocity, etc.

Often a mass flow controller will comprise several different components (i.e., a flow sensor, feedback controller, valve etc.) coupled together in a control loop. Each component that is part of the control loop may have an associated gain. In general, the term gain refers to the relationship between an input and an output of a particular component or group of components. For instance, a gain may represent a ratio of a change in output to a change in input. A gain may be a function of one or more variables, for example, one or more operating conditions and/or characteristics of a mass flow controller (e.g., flow rate, inlet and/or outlet pressure, temperature, valve displacement, etc.) In general, such a gain function will be referred to as a gain term. A gain term, and more particularly, the representation of a gain term may be a curve, a sample of a function, discrete data points, point pairs, a constant, etc.

Each of the various components or group of components of a mass flow controller may have an associated gain term (a component having no appreciable gain term can be considered as having a unity gain term). The relationship between gain terms associated with the various components of a mass flow controller is often complex. For example, the different gain terms may be functions of different variables (i.e., operating conditions and/or characteristics of the components), may be in part non-linear, and may be disproportionate with respect to one another.

Accordingly, the contributions of each gain term associated with the components around a control loop of a mass flow controller will itself be a gain term. This composite gain term may itself be a function of one or more variables and may contribute, at least in part, to the sensitivity of the mass flow controller with respect to change in operating conditions and/or characteristics of the various components of the mass flow controller.

According to one aspect of the present invention, a mass flow controller is provided having a control loop with a constant loop gain. According to one embodiment, the constant loop gain is provided by determining a reciprocal gain term by forming the reciprocal of the product of the gain terms associated with one or more components around the control loop of the mass flow controller and applying the reciprocal gain term to the control loop.

A constant loop gain describes a gain of a control loop of a mass flow controller that remains substantially constant with respect to one or more operating conditions of the mass flow controller. In particular, a constant loop gain does not vary as a function of specific operating conditions associated with a mass flow controller, or as a function of the individual gain terms associated with the control loop. It should be appreciated that a constant loop gain may not be precisely constant. Imprecision in measurements, computation and calculations may cause the constant loop gain to vary. However, such variation should be considered encompassed by the definition of a constant loop gain as used herein.

It should further be appreciated that the gain of certain components of the mass flow control may vary with operating frequency, and that signals of the mass flow controller may have frequency components at many different frequencies. However, frequency is not considered an operating condition, and as such, is not considered as a condition over which a constant loop gain remains constant.

Following below are more detailed descriptions of various concepts related to, and embodiments of, methods and apparatus according to the present invention for control and configuration of a mass flow controller. It should be appreciated that various aspects of the invention, as discussed above and outlined further below, may be implemented in any of numerous ways, as the invention is not limited to any particular implementation. Examples of specific implementation are provided for illustrative purposes only.

In this description, various aspects and features of the present invention will be described. The various aspects and features are discussed separately for clarity. One skilled in the art will appreciate that the features may be selectively combined in a mass flow controller depending on the particular application.

A. Control of a Mass Flow Controller

FIG. 1 illustrates a schematic block diagram of a mass flow controller according to one embodiment of the present invention. The mass flow controller illustrated in FIG. 1 includes a flow meter 110, a Gain/Lead/Lag (GLL) controller 150, a valve actuator 160, and a valve 170.

The flow meter 110 is coupled to a flow path 103. The flow meter 110 senses the flow rate of a fluid in the flow path, or portion of the flow path, and provides a flow signal FS2 indicative of the sensed flow rate. The flow signal FS2 is provided to a first input of GLL controller 150.

In addition, GLL controller 150 includes a second input to receive a set point signal SI2. A set point refers to an indication of the desired fluid flow to be provided by the mass flow controller 100. As shown in FIG. 1, the set point signal SI2 may first be passed through a slew rate limiter or filter 130 prior to being provided to the GLL controller 150. The filter 130 serves to limit instantaneous changes in the set point in signal SI1 from being provided directly to the GLL controller 150, such that changes in the flow take place over a specified period of time. It should be appreciated that the use of a slew rate limiter or filter 130 is not necessary to practice the invention, and may be omitted in certain embodiments of the present invention, and that any of a variety of signals capable of providing indication of the desired fluid flow is considered a suitable set point signal. The term set point, without reference to a particular signal, describes a value that represents a desired fluid flow.

Based in part on the flow signal FS2 and the set point signal SI2, the GLL controller 150 provides a drive signal DS to the valve actuator 160 that controls the valve 170. The valve 170 is typically positioned downstream from the flow meter 110 and permits a certain mass flow rate depending, at least in part, upon the displacement of a controlled portion of the valve. The controlled portion of the valve may be a moveable plunger placed across a cross-section of the flow path, as described in more detail with respect to FIG. 16. The valve controls the flow rate in the fluid path by increasing or decreasing the area of an opening in the cross section where fluid is permitted to flow. Typically, mass flow rate is controlled by mechanically displacing the controlled portion of the valve by a desired amount. The term displacement is used generally to describe the variable of a valve on which mass flow rate is, at least in part, dependent.

The displacement of the valve is often controlled by a valve actuator, such as a solenoid actuator, a piezoelectric actuator, a stepper actuator etc. In FIG. 1, valve actuator 160 is a solenoid type actuator, however, the present invention is not so limited, as other alternative types of valve actuators may be used. The valve actuator 160 receives drive signal DS from the controller and converts the signal DS into a mechanical displacement of the controlled portion of the valve.

As discussed above, the various components of the mass flow controller may have a gain term associated with the operation thereof. For example, FIG. 1 illustrates gain terms A, B, C and D associated with the flow meter 110, the GLL controller 150, the valve actuator 160, and valve 170, respectively. These components and their associated input and output signals, in particular, flow signal FS2, drive signal DS, valve signal AD, and the fluid flowing in the flow path 103, form a control loop of the mass flow controller. The gains A, B, C, and D, in turn, are associated with the relationship between said inputs and outputs. It should be appreciated that the gain terms around this control loop contribute to a composite control loop gain.

Typically, this control loop gain term is the product of the gain terms around the control loop (i.e., the control loop gain term is equal to the product $A*B*C*D$). As used herein, a composite gain term describes any gain term comprising the contributions of a plurality of individual gain terms. The notation for a composite gain term used herein will be appear as the concatenation of the symbols used to represent the individual gain terms contributing to the composite gain term. For example, the control loop gain term describe above will be represented as gain term ABCD. Unless otherwise noted, the notation described above for a composite gain term is assumed to be the product of its constituent gain terms.

The individual gain terms associated with a control loop of a mass flow controller may have differing characteristics and dependencies resulting in a composite gain term that may have multiple dependencies. These dependencies or variables may include set point or flow rate, fluid species, temperature, inlet and/or outlet pressure, valve displacement, etc. Applicants have recognized and appreciated that a mass flow controller having an arbitrary control loop gain term may be vulnerable to instability and may be sensitive to changes in some or all of the dependencies mentioned above. Below is a description of each of the exemplary gain terms illustrated in FIG. 1.

Gain term A is associated with the flow meter and represents the relationship between the actual fluid flow through the mass flow controller and the indicated flow (e.g., FS2) of the flow meter (e.g., change in indicated flow divided by change in actual fluid flow). Gain term A is calibrated to be a constant function of at least flow rate. However, this constant may depend at least upon the fluid species with which the mass flow controller operates.

Gain term B is associated with the GLL controller and represents the relationship between the indicated flow signal FS2 received from the flow meter and the drive signal DS provided to the valve actuator. Gain term B is related to the various gains and constants used in the feedback control of the GLL controller.

Gain term C is associated with the valve actuator and represents the relationship between a drive signal and the displacement of the valve. Gain C may include the combination of two separate gains including the gain associated with the conversion of a drive signal to an electrical current or voltage control signal, and the gain associated with the control signal and the mechanical displacement of the controlled portion of the valve.

Gain term D is associated with the valve and represents the relationship between a flow rate of the mass flow controller and valve displacement (e.g., a change in flow rate divided by a change in valve displacement.) Gain term D may be dependent on a variety of operating conditions including fluid species, inlet and outlet pressure, temperature, valve displacement, etc. According to one aspect of the present invention described in more detail below, a physical model of a valve is provided that facilitates the determination of a gain term associated with the valve with arbitrary fluids and operating conditions.

Gain term G is a reciprocal gain term formed from the reciprocal of the product of gain terms A, C, and D. As will be appreciated further from the discussion herein, gain term G permits the mass flow controller to operate in a consistent manner irrespective of operating conditions by providing to a control loop of the mass flow controller a constant loop gain.

According to one aspect of the present invention, a system gain term is determined for a particular mass flow controller by determining the composite gain term of various components around the control loop of the mass flow controller. A reciprocal gain term is formed by taking the reciprocal of the system gain term. This reciprocal gain term is then applied to the control loop such that the control loop operates with a constant loop gain. Thus, as the various gain terms around the control loop vary, the reciprocal gain term may be varied in order to maintain a constant loop gain.

Because the loop gain of the mass flow controller is held constant irrespective of the type of fluid used with the mass flow controller, and irrespective of the operating conditions with which the mass flow controller is operated, the response of the mass flow controller with different fluids and/or operating conditions can be made stable and to exhibit the same behavior as that observed during production of the mass flow controller on a test fluid and test operating conditions.

Unless otherwise noted, the system gain term is the composite of gain terms around the control loop associated with various components of the mass flow controller that inherently vary as a function of one or more operating conditions. For example, the system gain term in FIG. 1 is composite gain term ACD.

In block 140 of FIG. 1, a reciprocal gain term G is formed by taking the reciprocal of system gain term ACD and applying it as one of the inputs to the GLL controller. It should be appreciated that the reciprocal gain term may be the reciprocal of fewer than all of the gain terms associated with the various components around the control loop of the mass flow controller. For example, improvements in control and stability may be achieved by forming the reciprocal of composite gain terms AC, AD, CD etc. However, in preferred embodiments, gain term G is formed such that the loop gain remains a constant (i.e., gain G is the reciprocal of the system gain term).

Figure 2:
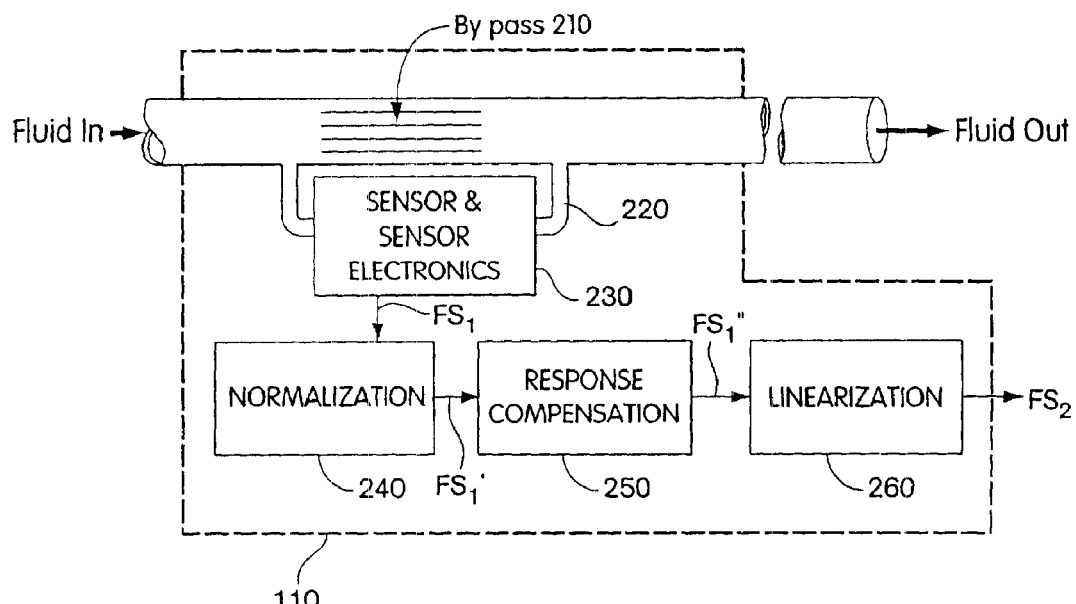
FIG. 2 is a more detailed schematic block diagram of the flow meter shown in FIG. 1.

FIG. 2 illustrates a more detailed schematic block diagram of the flow meter 110. A flow meter refers generally to any of various components that sense flow rate through a flow path, or a portion of a flow path, and provide a signal indicative of the flow rate. The flow meter 110 of FIG. 2 includes a bypass 210, a sensor and sensor electronics 230, a normalization circuit 240 to receive the sensor signal FS1 from the sensor and sensor electronics 230, a response compensation circuit 250 coupled to the normalization circuit 240, and a linearization circuit 260 coupled to the response compensation circuit 250. The output of linearization 260 is the flow signal FS2 as illustrated in the mass flow controller of FIG. 1.

Although not shown in FIG. 2, in some embodiments, the sensor signal FS1 may be converted to a digital signal with the use of an analog to digital (A/D) converter so that all further signal processing of the mass flow controller 100 may be performed by a digital computer or digital signal processor (DSP). Although in one preferred embodiment, all signal processing performed by the mass flow controller 100 is performed digitally, the present invention is not so limited, as analog processing techniques may alternatively be used.

In FIG. 2, a sensor conduit 220 diverts some portion of the fluid flowing through the flow path, with the remainder and majority of the fluid flowing through the bypass. Sensor and sensor electronics 230 are coupled to the sensor conduit and measure the flow rate through the conduit. The amount of fluid flowing through the conduit is proportional to the fluid flowing in the bypass. However, within the range of flow rates with which a mass flow controller is intended to operate, the relationship between the flow rate in the conduit and the flow rate in the bypass may not be linear.

In addition, thermal sensors measure flow rate by detecting temperature changes across an interval of the conduit. Accordingly, in some embodiments, particularly those that implement thermal sensors, there may exist temperature dependencies, particularly at the two extremes of the range of flow rates with which a mass flow controller operates (referred to herein as zero flow and full scale flow, respectively).

Normalization circuit 240 receives the sensor signal FS1 and corrects for potential temperature dependence at zero flow and at full scale flow. In particular, when no fluid is flowing through the conduit and/or bypass (i.e., zero flow), the sensor may produce a non-zero sensor signal. Furthermore, this spurious indication of flow may depend on temperature. Similarly, the sensor signal FS1 may experience fluctuation that is dependent on temperature at full-scale flow. Correction for temperature dependent variation in the signal FS1 at zero flow may be performed by measuring the value of the sensor signal FS1 at zero flow at a number of different temperatures, and then applying a correction factor to the signal FS1 based upon the temperature of the sensor. Corrections for temperature dependent variation of sensor signal FS1 at full-scale flow may be performed in a similar manner based upon measurements of the sensor signal at different values of temperature and applying an appropriate correction factor based on the temperature.

In addition, temperature dependencies may be similarly measured for characteristic points along the entire range at which a mass flow controller is desired to operate. Accordingly, a correction curve that is a function of flow rate and temperature may be fit to the measurements taken a zero flow, full scale flow, and any number of characteristic points in between. This correction curve may provide correction for temperature dependencies across the range of flow rate with which the mass flow controller is intended to operate. In addition, a knowledge of the fluid being used and known sensor property variations with temperature may be utilized to provide or enhance the correction factors and/or correction curves of normalization 240.

The normalization circuit 240 may also provide a fixed normalization gain to the signal FS1 so that at full scale flow through the sensor conduit, a specific value is obtained for normalization signal FS1', and at zero flow, another specific value (e.g. zero) is obtained.

In one embodiment, for example, normalization 240 ensures that at zero flow through the sensor conduit, normalization signal FS1' has a value of 0.0, and at full scale flow through the conduit, normalization signal FS1' has a value of 1.0. It should be appreciated that any value may be chosen for normalization signal FS1' at zero flow and at full scale flow, as values used herein are exemplary only.

It should be appreciated that normalization signal FS1' may have poor dynamic characteristics, such that in response to a step change in fluid flow, the signal FS1' is delayed in time and smoothed relative to the actual flow through the flow sensor. This is because thermal flow sensors typically have a slow response time as the thermal changes take place over a relatively long period of time.

Figure 3:
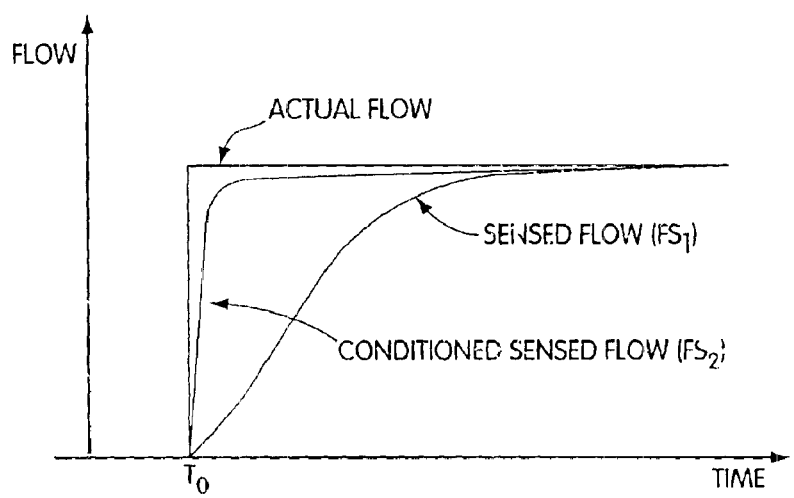
FIG. 3 illustrates various output signals of a mass flow sensor in response to a step change in flow according to an embodiment of the present invention.

FIG. 3 is an illustration of this behavior in which time is plotted on the horizontal or X-axis and flow is plotted on the vertical or Y-axis. As shown in FIG. 3, in response to a unit step change in actual flow through the thermal mass flow sensor, the signal FS1 provided by the sensor is delayed in time and smoothed.

In order to correct for these sensor effects and provide better dynamic response to changes in fluid flow, normalization signal FS1' is provided to response compensation circuit 250. The response compensation circuit 250 is functionally a filter that is approximately an inverse of the transfer function of the sensor and sensor electronics 230. The response compensation circuit 250 may be adjusted or tuned so that the conditioned signal FS1" provided by the response compensation circuit 250 has a predetermined rise time, has a predetermined maximum level of overshoot and/or undershoot, and levels out within a predetermined time frame, and/or is tuned for other characteristics that may be desirable for a particular implementation of a mass flow controller.

As shown in FIG. 3, the compensated signal FS1" has a profile that more closely reflects the profile of the step change in fluid flow through the sensor illustrated in the drawing. The flow meter of the mass flow controller may be adjusted to provide such a compensated signal during production of the mass flow controller. In particular, the dynamic response may be tuned during a sensor tuning step discussed in detail further below.

As discussed briefly above, the proportion of fluid flowing through the sensor conduit relative to the fluid flowing through the bypass may be dependent upon the flow rate of the fluid. In addition, non-linearities in the sensor and sensor electronics further complicate the relationship between actual fluid flow and the sensed flow signal provided by the sensor at different flow rates. The result is that a curve representing sensed flow versus fluid flow may not be linear.

It should be appreciated that many of these non-linearities carry through normalization 240 and response compensation 250. Accordingly, the immediate discussion is germane to any of sensor signals FS1, FS1', and FS1". The term sensor output will be used herein to describe the sensor signal before it has been linearized (i.e., preceding linearization 260.) In particular, and unless otherwise indicated, sensor output describes the signal produced by the sensor and that has been normalized and compensated (e.g., FS1"), for example, by normalization 240 and response compensation 250, respectively, but that has not been linearized. It should also be appreciated that normalization and compensation steps need not respect the order in which they are applied in FIG. 2, and are in fact interchangeable.

Linearization 260 corrects for the non-linearities of the sensor output (i.e., FS1") For example, linearization 260 provides a flow signal that will have a value of 0 at zero flow, 0.25 at 25% of full scale flow, 0.5 at 50% of full scale flow, 1.0 at full scale flow etc. Linearization 260 provides the flow signal FS2 provided to an input of GLL controller 150 as illustrated in FIG. 1. The term indicated flow will be used herein to describe generally the flow signal provided by a flow meter after it has been linearized (e.g. flow signal FS2).

Although there are a myriad of ways to linearize the sensor output, such as polynomial linearization, piece-wise linear approximation, etc., in one embodiment of the present invention, a spline is used to linearize this signal, and in particular, a cubic spline. A discussion of cubic splines is given in Silverman B. W. entitled "Some Aspects of the Spline Smoothing Approach to Non-Parametric regression Curve Fitting", published in the Journal of the Royal Statistics Society and is herein incorporated by reference in its entirety.

According to this aspect of the present invention, the actual output signal FS1 from the sensor and sensor electronics 230 is measured at a number of different (and known) flow rates on a test fluid or gas, and the measured flow rate is plotted against the known flow rate for all measurement points. This plotting of the measured flow rate versus the known flow rate defines the transfer function of the sensor and sensor electronics 230, and a cubic spline is then fit to the inverse of the transfer function of the sensor and sensor electronics 230. The measured value of the sensor output is then used as an input to the cubic spline to provide a normalized, compensated, and linearized indicated flow signal (e.g., FS2).

As will be discussed in further detail below, the linearization circuit 260 may include a linearization table (not shown) to facilitate linearization of the sensor output. In an alternative embodiment of the present invention, a cubic spline is fit to the transfer function of the sensor and sensor electronics 230 itself, rather than its inverse.

After compensating for non-linearities in the sensor and sensor electronics 230, and for the changing fraction of fluid flow that goes through the sensor conduit 220, the conditioned flow signal FS2 is provided to the GLL controller 150 and may also be provided to a filter 120 (FIG. 1) for display. An illustration of the conditioned flow signal FS2 is referenced "conditioned sensed flow (FS2)" and shown in FIG. 3.

As shown in FIG. 1, a gain term A is associated with the flow meter 110. This gain term represents the relationship between the fluid flowing in the flow path 103 and the indicated flow (i.e., flow signal FS2). In particular, gain term A is the ratio of change in indicated flow to change in actual fluid flow. It should be appreciated from the discussion of the flow meter 110 above, that this relationship (i.e., a curve of fluid flow versus indicated flow) has been made to be linear. Thus, the ratio of change in indicated flow to change in actual fluid flow (i.e., the derivative of the curve of fluid flow versus indicated flow) is a constant function of flow rate. Thus, gain term A is a constant for a particular fluid species.

Since gain A is a constant, and since indicated flow has been defined at a particular value at full scale flow, gain A can be determined for a particular fluid based upon the full scale flow associated with the fluid used during production of the mass flow controller. In the exemplary flow meter where indicated flow has been adjusted to have a value of 1.0 at full scale flow, gain A is simply the reciprocal of full scale flow.

It should be appreciated that full scale flow through a mass flow controller may change as a result of operating the mass flow controller with a different fluid. Hence, the mass flow controller will have a full scale range dependent on fluid species. Therefore, though gain A is a constant function of at least flow rate, this constant may change upon operation of the mass flow controller with a different fluid species.

However, Applicants have determined how the gain associated with the flow meter (e.g., gain term A) changes with fluid species. As discussed above, the gain of the flow meter can be directly calculated from full scale range (i.e., the full scale flow of the mass flow controller). Thus, determining the full scale range for a process fluid allows for a direct determination of the gain of the flow meter. The full scale range of a process fluid may be determined by applying a conversion factor to the full scale range associated with a test fluid. The conversion factor may be derived empirically from measurements with the particular fluid for which the full scale range is being determined.

Figure 4:
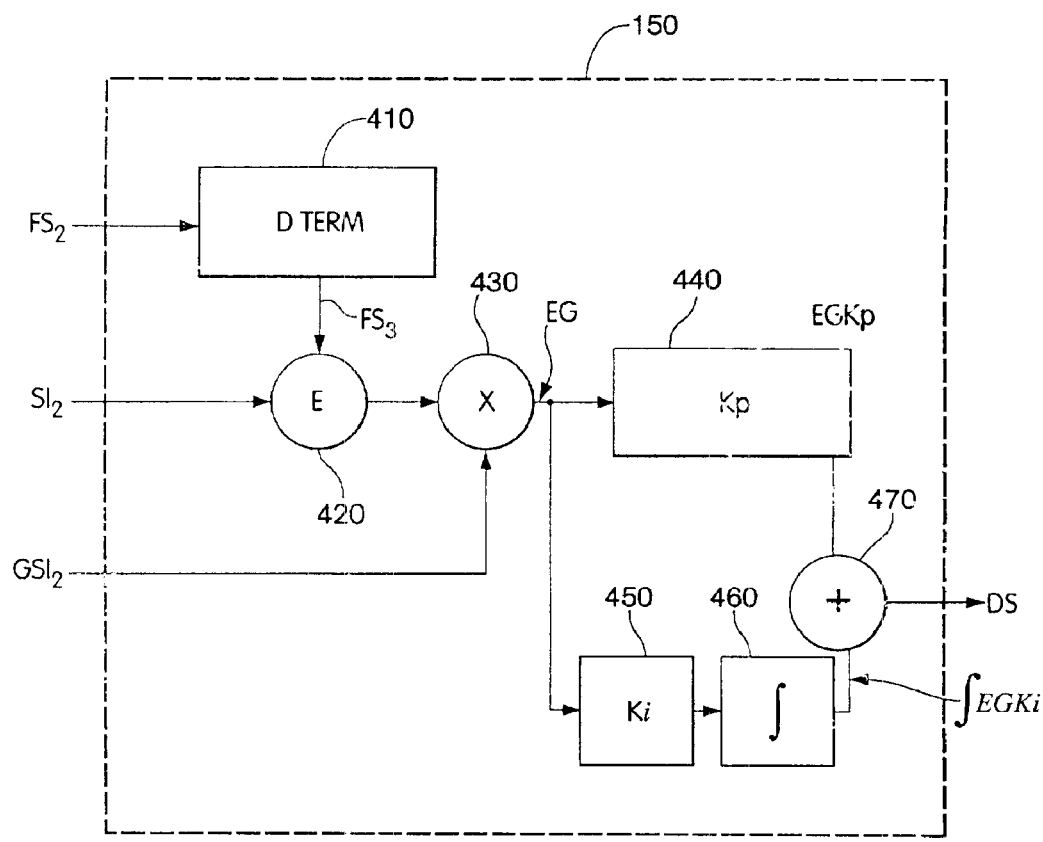
FIG. 4 is a more detailed schematic diagram of the Gain/Lead/Lag controller circuit shown in FIG. 1.
Figure 6A:
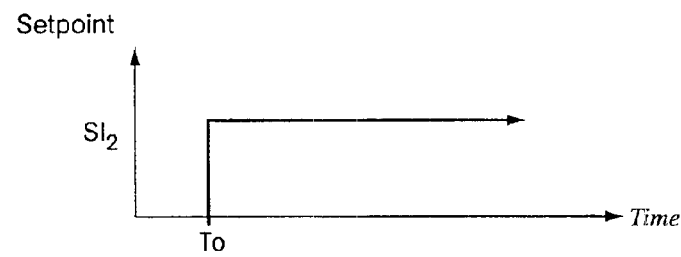
FIG. 6 illustrates signal waveforms of a number of the signals shown in FIG. 4.
Figure 6B:
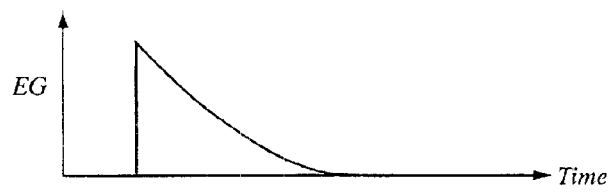
Figure 6C:
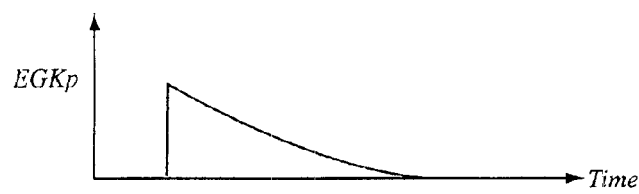
Figure 6D:
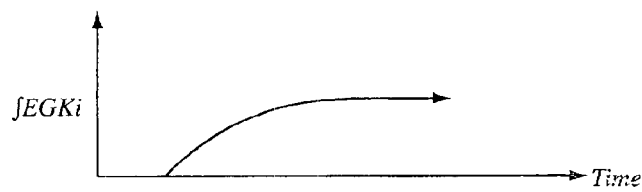
Figure 6E:
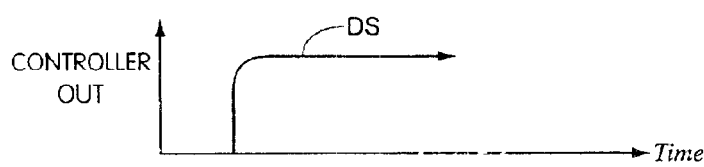
Figure 6F:
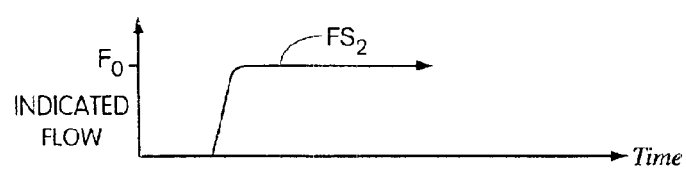

FIG. 4 illustrates details of one embodiment of the GLL controller 150. Although controller 150 is described herein as being a gain/lead/lag (GLL) controller, it should be appreciated that the present invention is not so limited. For example, the various aspects of the present invention may be used with other types of feedback controllers, such as proportional integral differential (PID) controllers, proportional integral (PI) controllers, integral differential (ID) controllers, etc. It should also be appreciated that numerous mathematical equivalents to the GLL controller 150 illustrated in FIG. 4 may alternatively be used, as the present invention is not limited to the specific controller structure illustrated therein.

The GLL controller 150 receives three input signals: the flow signal FS2 (also referred to as indicated flow); the set point signal SI2; and the reciprocal gain term G. As noted above, the set point signal SI2 may first be passed through a slew-rate limiter or filter 130 to prevent instantaneous changes in the set point signal from being provided to the GLL controller.

As noted in the foregoing, the Gain G 140 is a reciprocal gain term formed by taking the reciprocal of the product of the gain terms associated with various components around a control loop of the mass flow controller (i.e., the reciprocal of the system gain term), as discussed in detail herein. Gain G may be applied anywhere along the control loop and is not limited to being applied at the input of the controller of a mass flow controller. However, reciprocal gain term G may be conveniently applied to the input of the GLL controller as illustrated in FIGS. 1 and 4.

According to one embodiment of the present invention, gain term G may be determined by a microprocessor or digital signal processor associated with the mass flow controller. The processor may be integrated into the mass flow controller or may be external, as discussed below.

As shown in FIG. 4, the flow signal FS2 is provided to a differentiator or D-term circuit 410. Because the circuit 410 is not identically a differentiator, it is referred to as a "D-term" circuit herein. Indeed, within the D-term circuit 410, the flow signal FS2 is differentiated, low pass filtered, and multiplied by a constant and then summed with the conditioned flow signal FS2. It should be appreciated that the present invention is not limited to the particular implementation of the D-term circuit 410 described herein, as other types of differentiator circuits may be used. Functionally, the D term circuit 410 provides a modified flow signal FS3 that is "sped up" relative to the conditioned signal FS2, thereby constituting the "lead" in the GLL controller 150. The D term circuit 410 also provides damping. As should be appreciated by those skilled in the art, the D-term circuit 410 functionally provides a modified flow signal FS3 that is indicative of how the flow signal is changing and how quickly.

The modified flow signal FS3 is then provided, along with the set point signal SI2 to a subtraction circuit 420 that takes the modified flow signal FS3 and the set point signal SI2, and generates an error signal E based upon their difference. The error signal E is then multiplied by the gain term G (hence the word "gain" in a gain/lag/lead GLL controller) and provided to a proportional gain term 440 and an integral gain term 450.

The proportional gain term multiplies the signal EG by a fixed constant $K_P$, and then provides the output signal $EGK_P$ to a summing circuit 470. The proportional gain term 440 is used to functionally provide a component of the drive signal to move the control valve 170 a certain fixed amount based upon the signal EG, thereby allowing the control valve 170 to make up ground quickly upon a change in the error signal E.

The proportional gain term 440 also provides damping, helping to prevent ringing in the drive signal DS and in the resulting flow. For example, as the error signal E decreases, and the output signal from the integrator 460 is increasing, the value of the error signal E multiplied by $K_P$ decreases, as the constant $K_P$ is preferably less than unity, thereby decreasing the amount of overshoot that occurs.

The integral gain term 450 multiplies the signal EG by another fixed constant $K_I$, and then provides the output signal $EGK_I$ to an input of the integrator 460. The integrator 460 integrates the signal $EGK_I$ and provides the integrated output to a second input of the summing circuit 470. Functionally, the output of the integrator 460 provides a signal that is indicative of the error signal E over time, and represents how the error signal has changed in the past (hence the word "lag" in a gain/lead/lag GLL controller). Given an error signal E, the integrator 460 starts out at a specific slope, and as the indicated flow (e.g., FS2) increases (assuming a new and higher set point has been input), the error signal E decreases, such that the integrator 460 stops integrating, (i.e., slows down how fast it's changing) and the component of the drive signal output from the integrator 460 stops increasing. The integrated output signal $EGK_I$ is then summed with the output of the proportional gain term $EGK_P$ in summing circuit 470, and the summed output signal DS is provided as a drive signal to the valve actuator 160.

In addition, a pedestal (not shown) may be provided to preset the integrator 460 to a particular value when the controller is transitioning from a zero flow to a controlled flow state. The pedestal describes a value that when added to the integrator will provide a drive level DS that is just below the drive level necessary to open the valve and permit flow. In this manner, the time that would have been necessary for the integrator to ramp up to the pedestal value can be eliminated and the controller will have an increased response time to transitions between zero flow and controlled flow.

Figure 5:
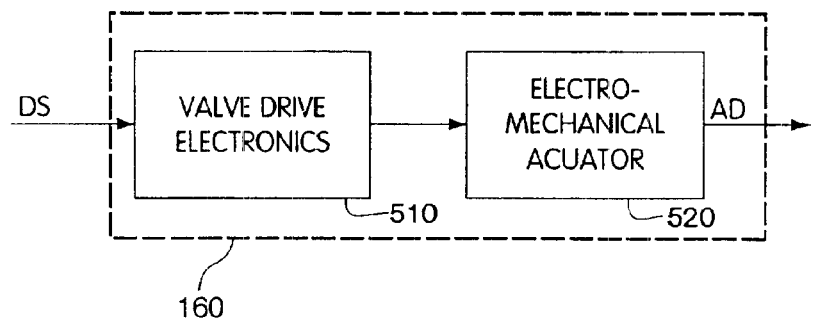
FIG. 5 is a more detailed schematic block diagram of the valve actuator shown in FIG. 1.

As shown in FIG. 5, the output of the summing circuit is provided to the valve actuator 160 which generally includes a valve drive electronics circuit 510 that is coupled to an electromechanical actuator 520. Any suitable valve drive electronics circuit 510 may be used to receive the drive signal DS and convert the drive signal DS to a voltage, current, or other signal capable of moving the valve 170 to a desired position to give the desired rate of flow. Further, the valve drive circuit 510 may include any suitable valve drive actuation circuit known in the art for driving solenoid actuated control valves, piezoelectrically actuated control valves, etc. According to one embodiment of the present invention utilizing a solenoid actuated control valve, the valve drive electronics circuit 510 may include circuitry that reduces the impact of hysteresis in the solenoid actuated control valve as described further in detail below.

FIG. 6 is an illustration of a number of the signals described above with respect to FIG. 4 in which the horizontal or X-axis represents time and the vertical or Y-axis represents the identified signal level. As shown in FIG. 6A, at a time $T_0$, a step change (to the level $F_0$) in the set point in signal SI2 is provided. At this time, the error signal E rises to the level $F_0$, as the error signal E is equal to the difference between the conditioned flow signal FS2 (which is still at its prior state), and the value of the set point in signal SI2, which is now at a value of $F_0$. The error signal times the gain term G (i.e., signal EG) thus steps to a high value and then decreases with time in the manner shown in FIG. 6B. As the output of the proportional gain term 440 is the signal EG multiplied by the constant $K_P$ (which is less than unity), the signal $EGK_P$ has a similar shape, although slightly reduced in amplitude, as shown in FIG. 6C. As shown in FIG. 6D, at the time $T_0$, the integrated output signal $EGK_I$ is zero, but quickly starts ramping upward due to the magnitude of the error signal E. The output of the summing circuit 470, representing the sum of the output signal $EGK_P$ and the integrated output signal $EGK_I$ is labeled DS and is shown in FIG. 6E. Based upon the drive signal DS provided to the valve drive and valve drive electronics circuit 160, the control valve 170 is opened an increased amount and the indicated flow signal (e.g., flow signal FS2) starts increasing to the new level of the set point in SI2. As time progresses, the error signal E decreases, the output signal $EGK_P$ of the proportional gain term 440 decreases, as does the integrated output signal $EGK_I$, and the rate of flow is established at the level of the new set point.

Ideally, it is desired to get a step response in the true flow in response to a step input applied to the set point in of the mass flow controller. Although this is not practically possible, embodiments of the present invention may be used to provide a consistent response in response to a step input in the set point, irrespective of whether the step input represents a 2% step or a 100% step relative to full scale flow, irrespective of the fluid being used, and irrespective of the inlet or outlet pressure, etc. To obtain this consistency, embodiments of the present invention provide a mass flow controller having a constant loop gain.

It should be appreciated from the foregoing that while various gains associated with the components along a control loop of a mass flow controller may vary as functions of different variables, and may depend upon a variety of different operating conditions, consistent and stable operation of a mass flow controller can be attained for a set of operating conditions by providing the control loop of the mass flow controller with a constant loop gain.

It should be appreciated that various aspects of the control of a mass flow controller may be implemented using a microprocessor. For example, GLL controller 150 may be implemented as a microprocessor, digital signal processor etc. Likewise, the determination of various control parameters such as the reciprocal gain term (e.g., gain term G) may be provided by a microprocessor. Various aspects of the control of a mass flow controller may be implemented in software, firmware or hardware using techniques that are well known in the art.

B. Mass Flow Controller Configuration

It should be appreciated that in many cases, in order for a mass flow controller to operate consistently and in a stable manner, the mass flow controller must be tuned and/or calibrated during production. Manual tuning and/or calibration is often a time consuming, labor intensive, and expensive process. In addition, when a process requires that the mass flow controller be configured to operate with a different fluid species and/or operating conditions than that used during production, the performance of a mass flow controller will rarely exhibit the same behavior observed during production of the mass flow controller, even if the mass flow controller was tuned and calibrated on a number of process fluids. In other words, the mass flow controller may have a different response when operating with a fluid and/or operating conditions other than that with which the mass flow controller was tuned and/or calibrated.

According to one aspect of the present invention, a method of configuring a mass flow controller is provided that permits the response of the mass flow with a process fluid and/or process operating conditions to be made substantially the same as the response for which the mass flow controller was tuned and/or calibrated with a test fluid and test operating conditions.

In one embodiment of the present invention, during tuning and/or calibration of a mass flow controller with a single test fluid and a set of test operating conditions, configuration data is obtained. This configuration data may be used to configure the mass flow controller to operate with an arbitrary process fluid and/or operating conditions, thus alleviating performance degradation due to operation with a fluid and/or operating conditions other than those used during production, and obviating expensive and time-consuming tuning and/or calibration of the mass flow controller on multiple surrogate fluids.

Figure 7A:
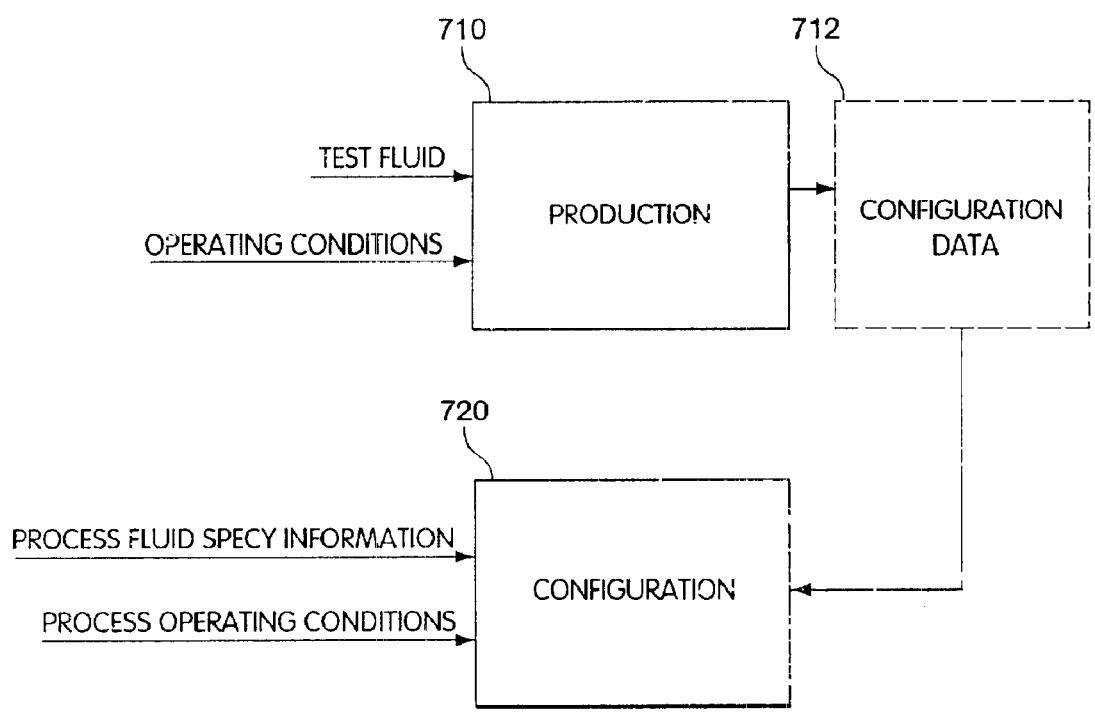
FIG. 7a-7f illustrates a method of configuring a mass flow sensor for operation with a process fluid and/or process operating conditions according to an embodiment of the present invention.

Providing a mass flow controller that is capable of operating with arbitrary fluids and operating conditions and exhibiting a satisfactory response often involves steps including an initial production of the mass flow controller and a subsequent configuration of the mass flow controller. FIG. 7a illustrates production and configuration steps according to one embodiment of the present invention.

The term production, as used herein and when applied to a mass flow controller, describes generally the various tasks involved in preparing a mass flow controller for operation on a specific fluid species and a particular set of operating conditions. Production may include building the mass flow controller from various components, operating the mass flow controller on a test fluid under test operating conditions, and tuning and/or calibrating various components and/or control parameters of the mass flow controller such that the mass flow controller exhibits satisfactory behavior and performance (i.e., has a satisfactory response) with the test fluid and test operating conditions.

The term configuration or configuring, as used herein and when applied to a mass flow controller, describes generally the various steps involved in adapting a mass flow controller for operation with an arbitrary fluid under arbitrary operating conditions. In particular, configuration describes steps involved in adapting a mass flow controller for operation with a fluid other than the fluid with which the mass flow controller underwent production (referred to herein as a "process fluid" and a "test fluid", respectively), and under conditions that may be different than the set of operating conditions used during production of the mass flow controller (referred to herein as "process operating conditions" and "test operating conditions", respectively), such that the response of the mass flow controller is substantially the same as that observed during production. It should be appreciated that configuration of a mass flow controller may be performed at any time after production, and in any location, including, but not limited to, the manufacturing site (e.g., to configure the mass flow controller for a particular known application), or the field (e.g., at an end user's site of operation).

In general, the term satisfactory response refers to a response of a mass flow controller that performs within a set of given tolerances of a particular mass flow control process or task. In particular, the dynamic and static response of the mass flow controller performs within a range of tolerances for which the mass flow controller was intended to operate.

A mass flow controller may be tuned and/or calibrated during production to have a satisfactory response for an arbitrary set of tolerances. Thus, the response of a mass flow controller after tuning and/or calibration on a test fluid and a set of test operating conditions, unless otherwise stated, should be considered to have a satisfactory response for that test fluid and operating conditions. However, the response may change substantially when the mass flow controller is operated with a different fluid and/or operating conditions, such that the response is no longer satisfactory.

In general, a mass flow controller is considered to have the same response on a test fluid and test operating conditions and on a process fluid and/or process operating conditions when both responses are satisfactory (i.e., both responses perform within the tolerances for which the mass flow controller was intended to operate).

As illustrated in FIG. 7a, during production 710, the mass flow controller is operated with a test fluid under a set of test operating conditions. Characteristics of the operation of the mass flow controller are obtained and stored as configuration data 712.

The configuration data 712 may be obtained during various tuning and/or calibration steps of production 710, as described in further detail with respect to FIGS. 7b—7f.

The term tuning describes steps that involve providing satisfactory dynamic response and behavior to fluid flow and a change in fluid flow and/or change in desired fluid flow (i.e., a change in set point). The term calibration refers generally to steps that involve providing a satisfactory steady-state or static response of a mass flow controller.

The term configuration data applies generally to information obtained during tuning and/or calibration of a mass flow controller. In particular, configuration data describes characteristics of and/or measurements taken from a mass flow controller during operation with a test fluid and test operating conditions. Configuration data obtained during production of a mass flow controller may then be used to configure the mass flow controller on a process fluid and/or process operating conditions.

As discussed briefly above, the terms test fluid and test operating conditions are used to describe a fluid and operating conditions that were used during production of a mass flow controller. The terms process fluid and process operating conditions describe fluids and operating conditions desired, typically, by an end user for a particular application of the mass flow controller.

It should be appreciated that the same type or types of fluids and operating conditions may be used for both test and process purposes. However, because a mass flow controller cannot be tuned on every fluid and/or under all operating conditions, certain aspects of the invention involve a mass flow controller being tuned and/or calibrated on a particular test fluid and under a particular set of test operating conditions during production such that the mass flow controller can be configured to operate with a different fluid and/or operating conditions thereafter. Accordingly, it should be understood that the term "process fluid" is not used to describe different types of fluids, but rather to demonstrate that the fluid may differ from the fluid with which the mass flow controller was tuned and/or calibrated. Similarly, the term "process operating conditions" describe a set of operating conditions that may not be the same as the test operating conditions with which the mass flow controller was tuned and/or calibrated.

One, some, or all of a set of process operating conditions may differ from the test operating conditions.

In configuration step 720, the configuration data 712 obtained during production may be used to facilitate configuration of the mass flow controller on a process fluid and/or process operating conditions. According to one embodiment, configuration data 712 is used during configuration 720 to determine control parameters associated with the mass flow controller that enable operation of the mass flow controller with a process fluid and/or process operating conditions. In particular, the configuration data 712 obtained during a production step 710 is used to determine control parameters that facilitate the configuration of the mass flow controller with a process fluid and process operating conditions, such that the mass flow controller exhibits a satisfactory response (i.e., the mass flow controller is configured to have substantially the same response with the process fluid and/or process operating conditions as that observed during production using the test fluid and test operating conditions).

The term control parameter as used herein refers generally to parameters associated with the mass flow controller that facilitate the operation of the mass flow controller. Control parameters may include, but are not limited to, filter coefficients, gain terms, controller constants, linearization curves etc. In particular, control parameters refer to parameters that may need change, modification, or addition when a mass flow controller is configured for operation with an arbitrary process fluid and/or process operating conditions (i.e., configured to exhibit a satisfactory response).

As used herein, the phrase "configured for operation" is intended to describe configuring a mass flow controller in such a way that when operated, the mass flow controller exhibits a satisfactory response (i.e., mass flow controllers having unsatisfactory responses are not generally considered operational).

It should be appreciated that, in general, production 710 need only be done once and with a single test fluid and a set of test operating conditions. However, configuration 720 may be repeated any number of times during the lifetime of a mass flow controller. In particular, whenever it is desirable to operate the mass flow controller with a different process fluid and/or operating conditions, it may be desirable to repeat configuration 720 with the new process fluid and/or process operating conditions such that the mass flow controller exhibits a satisfactory response with the new process fluid and/or process operating conditions.

It should be further appreciated that production and configuration of different types of mass flow controllers and different mass flow controller implementations may require different steps. However, production should include steps such that the mass flow controller has been properly characterized and a satisfactory response established for operation with a set of test operating conditions, and that sufficient configuration data has been obtained to facilitate subsequent configuration of the mass flow controller. Likewise, configuration in general should include steps necessary to establish substantially the same response when operating with a set of process operating conditions as that observed during production.

Figure 7B:
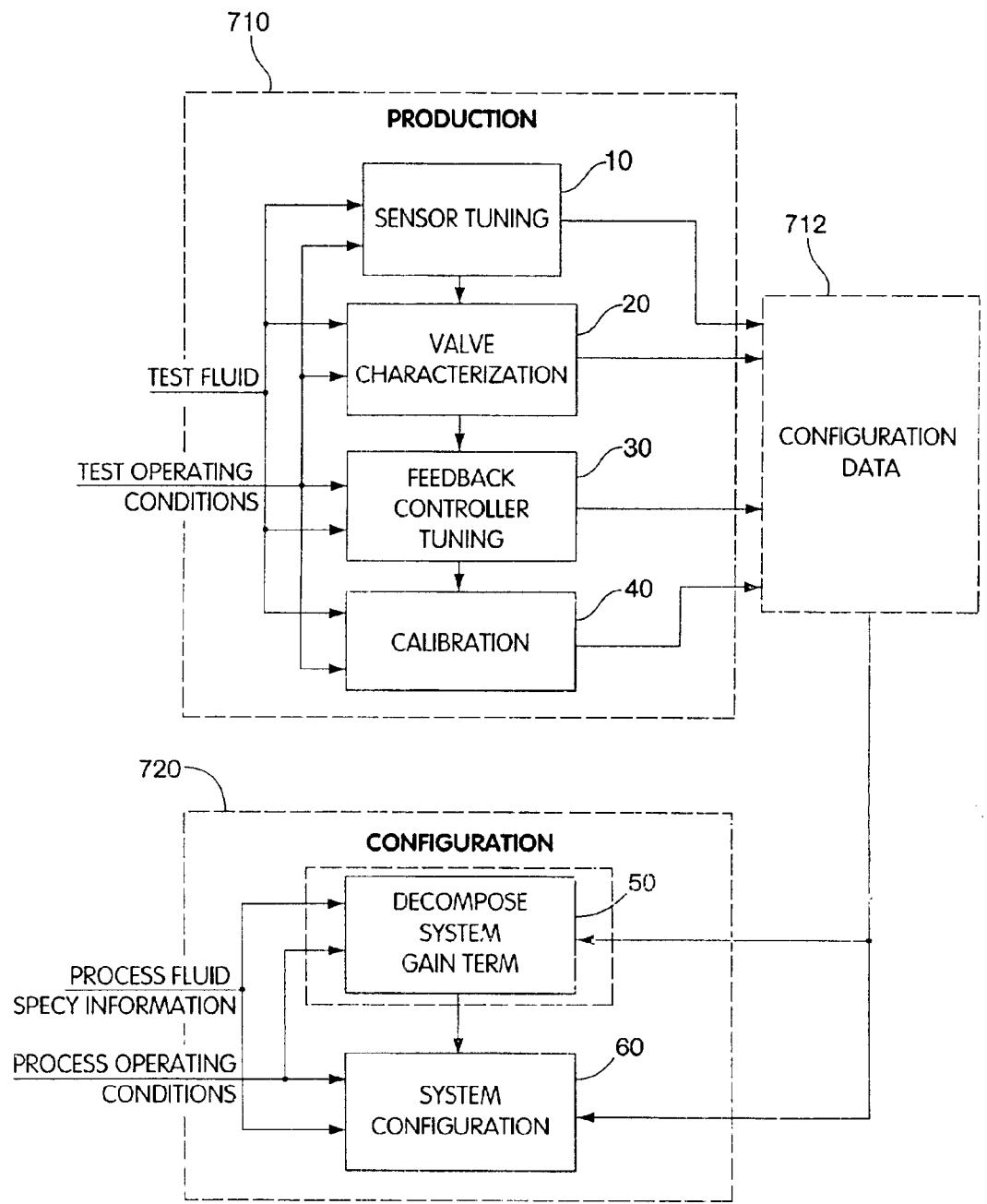

FIG. 7b illustrates a block diagram according to one embodiment that includes various steps that may be performed during the production and the configuration (e.g. steps 710 and 720 in FIG. 7a) of a mass flow controller. Production 710 may include a sensor tuning step 10, a valve characterization step 20, a feedback controller tuning step 30, and a calibration step 40. It should be appreciated that production 710 may include other steps that are not shown in production 710, for example, steps involved with building the mass flow controller, such as bypass matching etc., that are known in the art.

In the various exemplary steps 10–40 of production 710, the mass flow controller is characterized and a satisfactory response is established on a set of test operating conditions. Configuration data is obtained during production that facilitates configuration of the mass flow controller for operation with a set of process operating conditions, as describe further in detail below.

In sensor tuning step 10, the flow meter of a mass flow controller is tuned such that it exhibits a satisfactory dynamic response. In particular, the various components of the flow meter are tuned such that the sensor output (e.g. FS1") responds satisfactorily to changes in flow through the sensor. For example, as discussed in connection with FIG. 2, sensor tuning may include providing normalization and response compensation filter coefficients, correction curves, and/or gains such that the flow meter responds to fluid steps with a sensor output having a step shape that closely resembles the step changes in fluid flow in the flow path. Information obtained during tuning step 10, such as filter coefficients, correction curves and/or gain terms may be stored as configuration data 712

In valve characterization step 20, the mass flow controller is characterized sufficiently such that it can be configured to operate in a consistent and stable manner in response to changes in various operating conditions and/or characteristics. According to one embodiment, a system gain term of a control loop of the mass flow controller may be determined and a reciprocal of the system gain term determined and applied to the control loop to provide a constant loop gain. In addition, measurements made during the determination of the system gain term may be stored as configuration data and later used during configuration, as discussed further in detail below with respect to FIG. 7c.

In feedback controller tuning step 30, the control and control electronics associated with the feedback controller are tuned such that the mass flow controller exhibits satisfactory dynamic response to changes in set point. According to one embodiment, the various PID parameters discussed in connection with FIG. 4 may be set such that the GLL controller exhibits desirable dynamic characteristics such as settling time, maximum overshoot and undershoot, etc.

In calibration step 40, the mass flow controller is calibrated such that it exhibits satisfactory steady-state response. According to one embodiment, the mass flow controller is calibrated to provide a linear relationship between the actual fluid flow through the mass flow controller and the flow indicated by the flow meter (e.g. flow signal FS2, also called indicated flow) across the range of flow rates with which the mass flow controller was intended to operate.

In the exemplary steps 50 and 60 illustrated in configuration 720, the configuration data obtained during production 710 and information about the process operating conditions with which the mass flow controller is to be configured for operation is used to modify control parameters of the mass flow controller such that the response established during production does not substantially change when operating the mass flow controller with the process operating conditions.

As illustrated in FIG. 7b, configuration 720 of the mass flow controller may include a system gain decomposition step 50, and a system configuration step 60. In the system gain decomposition step 50, a system gain term is obtained and then decomposed into its constituent gain terms based, at least in part, on the configuration data obtained during production 710 of the mass flow controller.

However, system gain decomposition step 50 may not be necessary in some implementations of a mass flow controller and represents only one method by which a model of actuator behavior may be provided to system configuration step 60.

Accordingly, it should be appreciated that in the examples discussed herein, steps involving measurement and subsequent decomposition of a system gain term may be unnecessary under circumstances where gain terms associated with various components of a mass flow controller can be obtained directly. For example, in some mass flow controllers, a stepper actuator may be employed from which the associated gain term may be directly obtained from the mechanical design of the actuator. In such a case, measurement of a system gain during production (e.g. recording CDA' during valve characterization step 20 in FIG. 7c) and decomposition of the system gain term during configuration (e.g. step 50) can be omitted since the information provided by decomposing the system gain term (e.g., gain term C) can be obtained directly from the actuator itself.

The method of obtaining system gain term information during production and decomposing the system gain term during configuration, however, provides a method for configuring a mass flow controller that, in general, may be applied to any implementation of a mass flow controller to provide, for instance, a model of the actuator, where no other may be available, or such information cannot be directly obtained. As such, details of this method have been incorporated into production and configuration steps described in the embodiments illustrated in FIGS. 7c-7f. However, aspects of the invention are not limited to using this method, nor is it limited to mass flow controllers where this method may be necessary.

In the system configuration step 60, control parameters are determined for a process fluid and/or process operating conditions for which the mass flow controller is being configured, such that the mass flow controller exhibits a satisfactory response when operating with the process fluid and/or process operating conditions. According to one embodiment, a reciprocal gain term may be formed from the reciprocal of the product of the individual gain terms associated with various components of the mass flow controller operating with the process operating conditions. The gain terms may be determined from a physical model of the valve and the valve actuator. The reciprocal gain term may be applied to a control loop of the mass flow controller to provide a constant loop gain.

Further details of exemplary production steps and configuration steps are now described in connection with FIGS. 7c-7f.

Figure 7C:
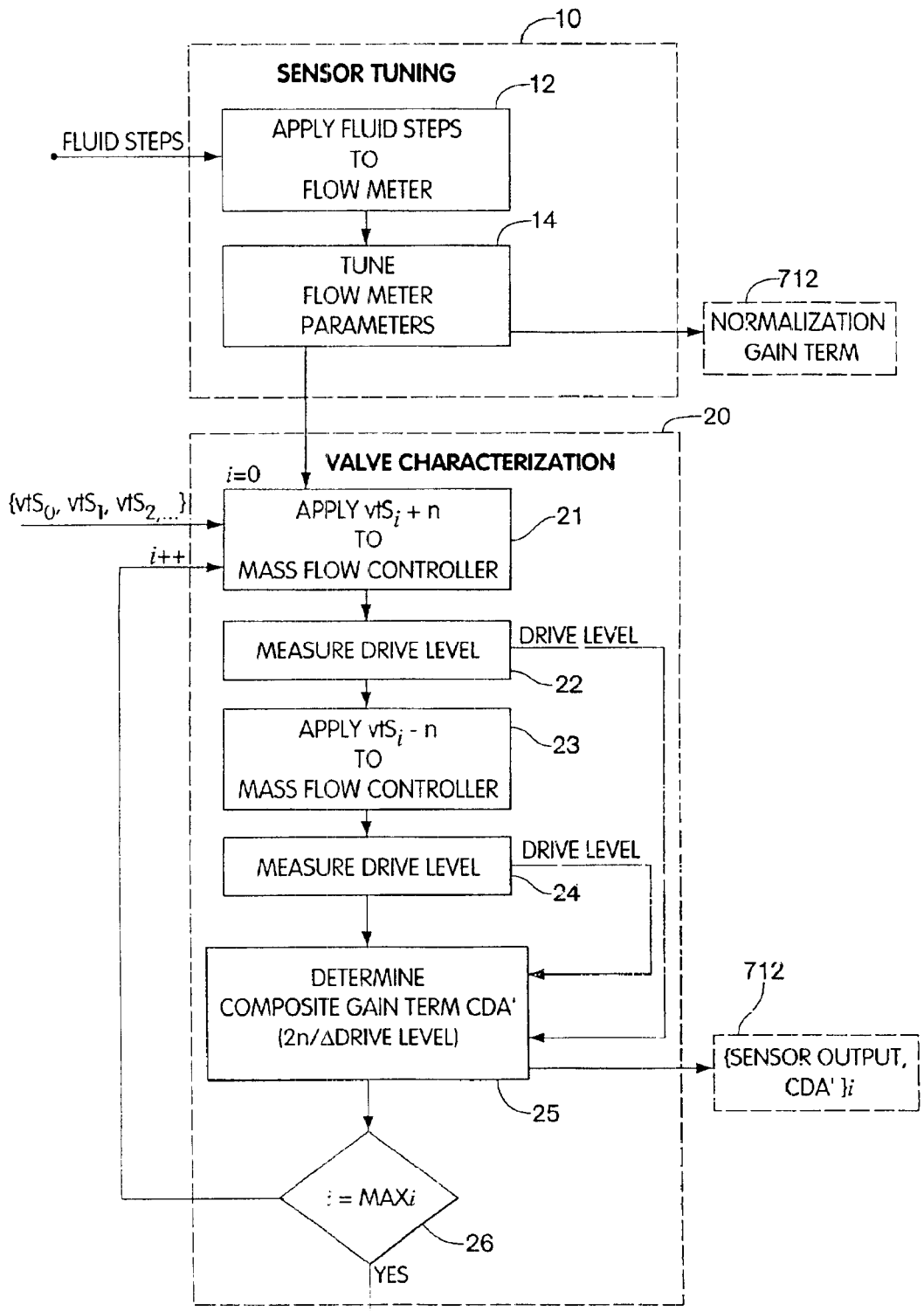
Figure 7D:
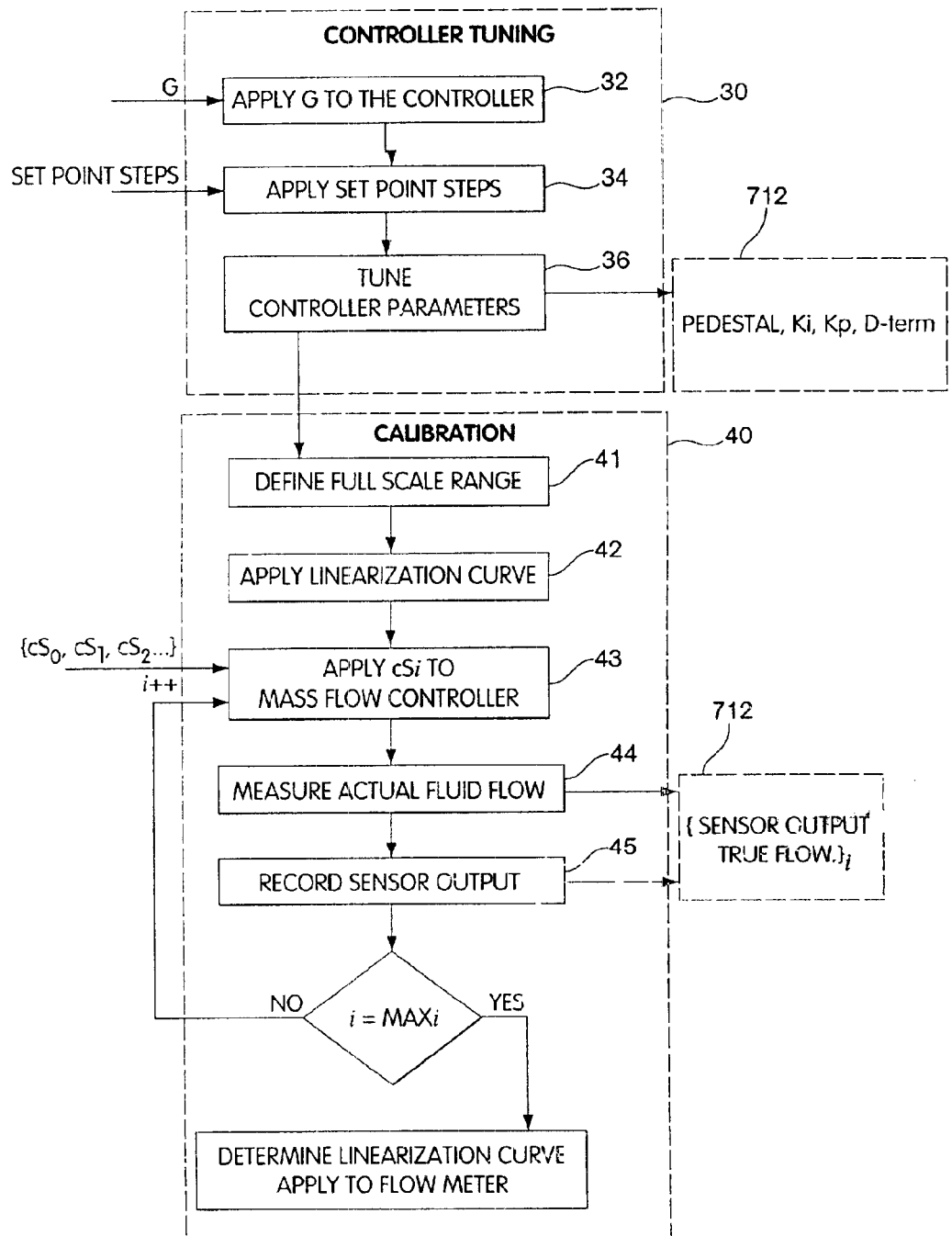

FIGS. 7c and 7d illustrate one exemplary procedure for obtaining configuration data during tuning and/or calibration of a mass flow controller during production.

Figure 7E:
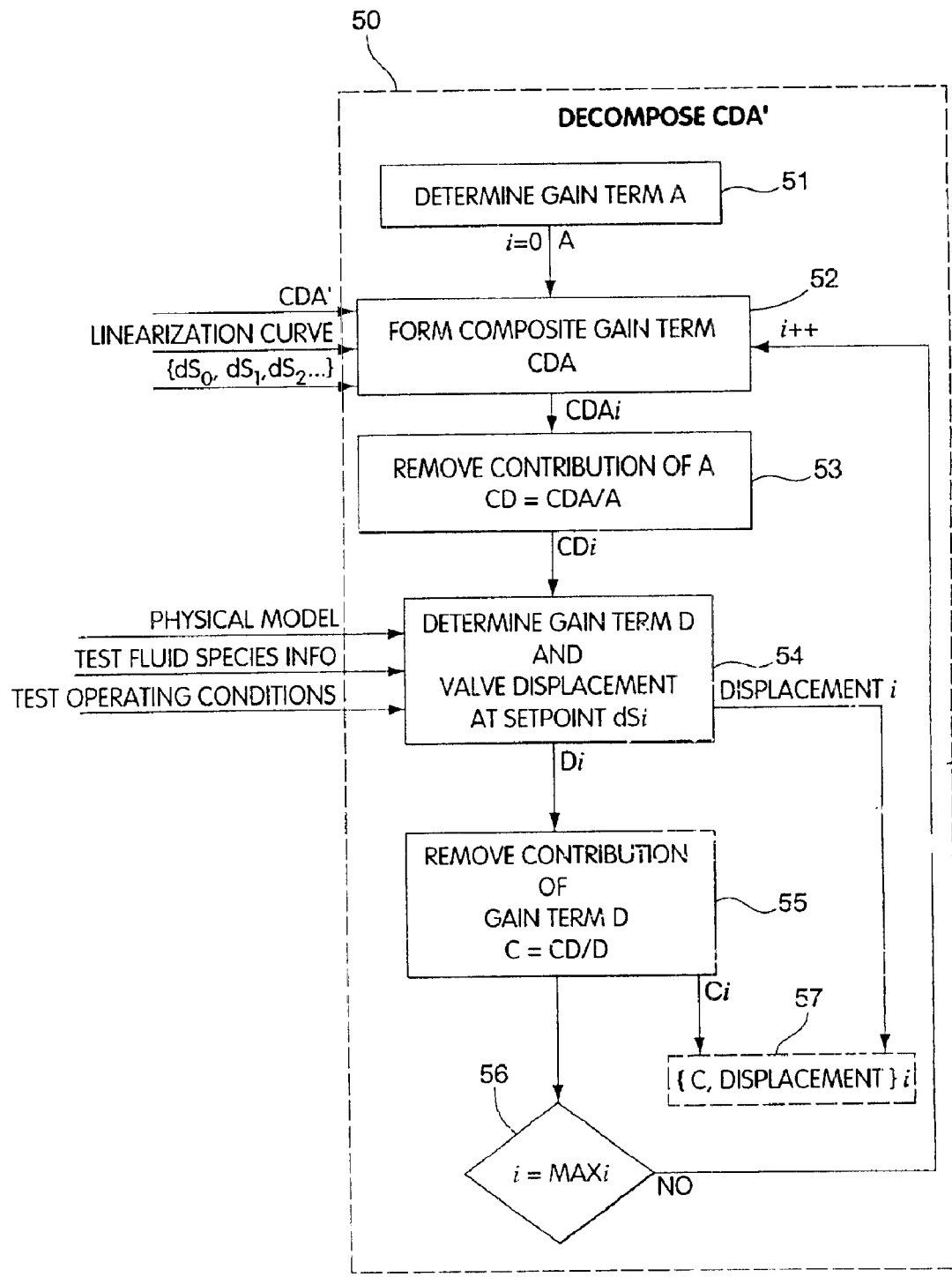
Figure 7F:
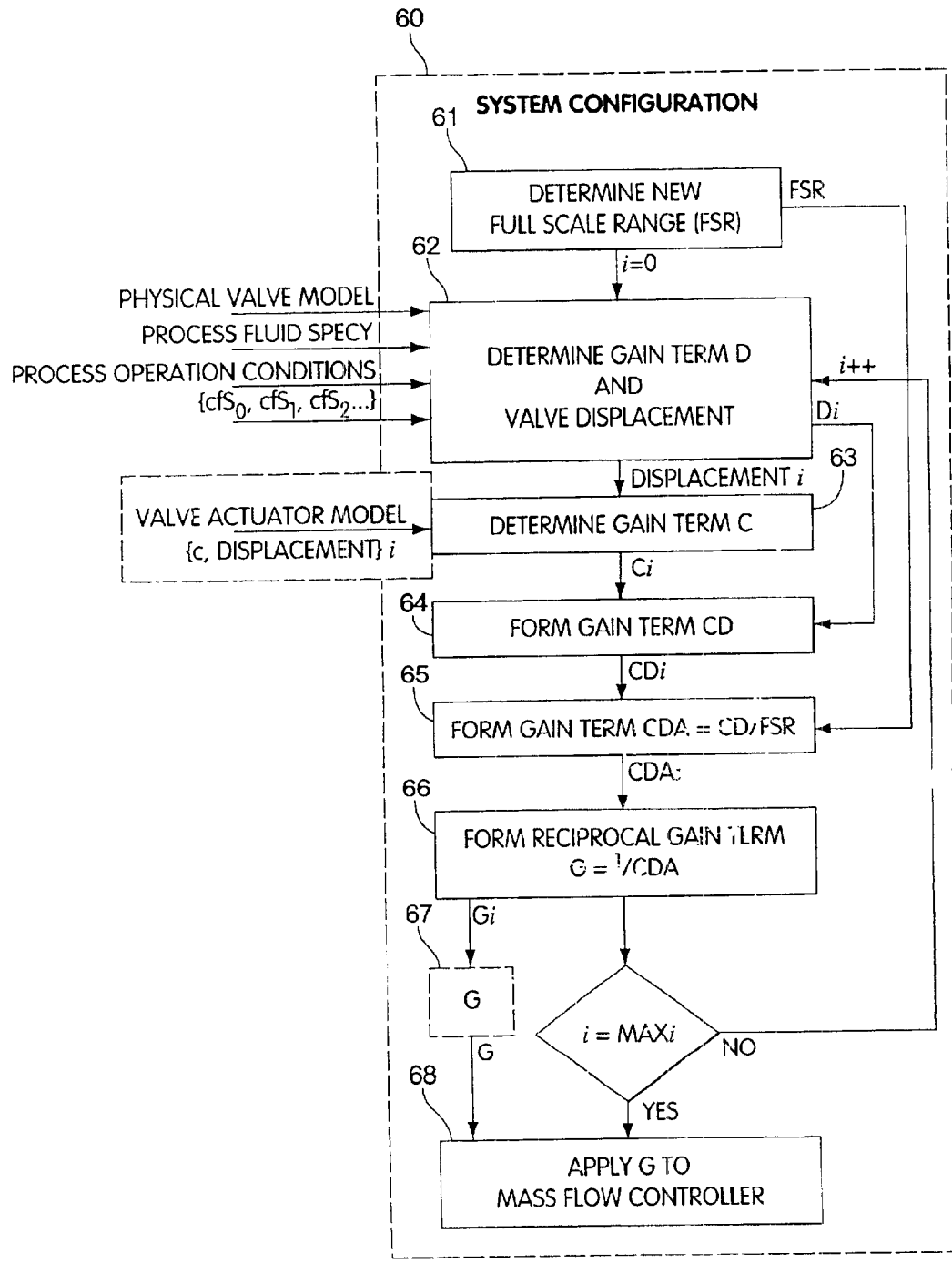

FIGS. 7e and 7f illustrate another exemplary procedure for configuring the mass flow controller to operate on a process fluid and/or process operating conditions different from those with which the mass flow controller was tuned and/or calibrated.

The procedures for production and configuration illustrated in FIGS. 7c-7f may be applied to a mass flow controller similar to that illustrated in FIG. 1. However, it should be appreciated that these aspects of the present invention are not so limited, and may be applied to a variety of mass flow controllers having a variety of different components and operating characteristics.

In FIGS. 7c-7f, exemplary information that may be stored as configuration data during the production of a mass flow controller are illustrated under the heading "Configuration Data" and placed within blocks labeled 712. It should be appreciated that the information illustrated in the drawings is not limiting, nor should it be considered a requirement. Each implementation of a mass flow controller may have a different set of configuration data that facilitates the configuration of the mass flow controller for operation with a process fluid and/or process operating conditions.

FIG. 7c illustrates further details of a sensor tuning step 10 and a valve characterization step 20 according to one embodiment of the present invention. In sensor tuning step 10, the flow meter of a mass flow controller is tuned such that it exhibits satisfactory dynamic response, for example, to a fluid step. A fluid step refers to a change in fluid flow having the characteristics of a step function, including both positive and negative steps in fluid flow.

In step 12, fluid steps are applied to the flow sensor. The flow sensor is then tuned in step 14, such that in response to a fluid step, a step-shaped flow signal is provided. Desirable characteristics of this step-shaped flow signal may include rise time, settling time, maximum overshoot and undershoot, etc. For example, referring back to the mass flow controller described with respect to FIGS. 1 and 2, the step of tuning the flow sensor may include tuning of sensor and sensor electronics 230, normalization 240, and response compensation 250. For example, the filter coefficients of the response compensation filter 250 may be tuned to reshape the signal as shown in FIG. 3. It should be appreciated that in general, each implementation of a mass flow controller may have a different set of parameters that may be tuned. However, the intent of the sensor tuning process 10 is to ensure that the flow sensor exhibits satisfactory dynamic characteristics. As shown in FIG. 7c, the normalization gain associated with providing a sensor output of 1.0 for full scale flow through the sensor conduit may be recorded as configuration data.

In the valve characterization process 20, a test fluid is provided to the mass flow controller at different set points of a set of selected set points at a known inlet and outlet pressure. At each set point the resulting drive level is recorded. The term drive level describes the value of the drive signal provided to the valve actuator. For instance, the drive level may be the measured value of an electrical current or a voltage potential. The drive level may also be the value of a digital control signal that may be converted into an electrical signal to control the mechanical displacement of the valve. Signal DS in FIG. 1 is an example of a drive signal, the value of which is the drive level.

In one embodiment, a GLL controller that has not been tuned, but that is known to converge, is used during this step. Accordingly, each set point in the set of selected set points will converge to the sensor output. In some embodiments, the sensor output and drive level information recorded during this step is used to calculate a composite gain term of the mass flow controller. For example, in valve characterization step 20 of FIG. 7c, a composite gain term CDA' corresponding to the product of the gain terms associated with the valve actuator 160, the valve 170, and the flow meter 110 is calculated from information obtained during the characterization of the valve.

In step 21, a series of set points from a selected set of set points is provided to the mass flow controller. The set of selected set points may be chosen in any suitable manner. For example, in one embodiment, the set of selected set points are various fractions of full-scale flow that account, at some level, for the range with which the mass flow controller is intended to operate. The selected set points need not be evenly spaced out across the range of values. In addition, any number of set points may be selected. In general, the number of set points selected should be sufficient to adequately characterize the valve actuator over the range with which the mass flow controller was intended to operate.

Each of the various selected sets of set points illustrated in FIGS. 7c-7f need not be identical to one another. In order to illustrate that the set points need not be the same in each set, the subscripts vt, cb, and cf, for example, have been used to indicate set points chosen for the valve characterization, calibration, and configuration steps, respectively. However, it should be appreciated that these sets may be in part or entirely the same.

In step 21, a first set point $_{vt}S_0$ is chosen from a selected set of set points $\{_{vt}S_0, _{vt}S_1, _{vt}S_2, \ldots\}$. A small deviation n is chosen as an offset to the set points $_{vt}S_i$. Then, $_{vt}S_0+n$ is applied to the controller and the controller is allowed to converge. When the controller converges, sensor output will equal the applied set point. In step 22, the resulting drive level is recorded for set point $_{vt}S_i$.

In step 23, $_{vt}S_0-n$ is applied to the controller and allowed to converge. The resulting drive level is again recorded as shown in step 24. In step 25, a composite gain term CDA' is determined. For example, the composite gain term may be determined by taking a change in the two set points (i.e., 2n) and dividing the change by a change in the drive levels recorded in steps 22 and 24. This ratio represents the composite gain term CDA' for set point $_{vt}S_0$. Gain terms C and D, as described in the foregoing, are associated with the valve actuator and valve respectively. Gain term A' is associated with the flow meter and represents the gain of the flow meter without the contribution of linearization 260 (i.e., the gain associated with sensor output). The sensor output value to which the mass flow controller converged for each set point $_{vt}S_i$, and the composite gain term CDA' determined at that set point may be stored as configuration data.

Steps 21–25 are repeated for each of the set points $_{vt}S_i$ in the set of selected set points. The result is a set of point pairs {sensor output, CDA'}$_i$. In one embodiment, the set of point pairs {sensor output, CDA'}$_i$ is recorded as configuration data for the manual tuning of the mass flow controller. In addition, for each CDA' recorded in step 20, a reciprocal gain term G=1/CDA' may be formed. This reciprocal gain term G may be provided to the controller in the succeeding controller tuning step to provide stability to the controller.

In the feedback controller tuning step 30, the various parameters associated with the feedback controller of the mass flow controller are tuned to provide satisfactory dynamic response to a series of fluid steps provided to the mass flow controller. It should be appreciated that each implementation of a mass flow controller may have a different method of control (e.g., GLL, PID, ID, etc.). One exemplary procedure for tuning a feedback controller of a mass flow controller is now described with respect to the GLL controller depicted in FIG. 4.

In step 32, the reciprocal gain term G formed from the measurements made in step 20 is applied to the GLL controller. In step 34, fluid steps are provided to the mass flow controller by stepping the set point. For example, $SI_2$ in FIG. 1 is modified by a set of different changes in set points $\Delta S_i$. The different $\Delta S_i$ may be chosen such that the controller is tuned appropriately for large step changes (e.g., a $\Delta S_i$ of 100% of full scale flow) and small step changes (e.g., a $\Delta S_i$ of 5% of the full scale flow). The number and magnitude of the various $\Delta S_i$ may differ for each implementation and according to the differing operating requirements of a particular mass flow controller implementation.

In step 36, the various parameters of the GLL controller are set such that the GLL controller responds satisfactorily to the different changes in set point as defined by the various $\Delta S_i$. For example, parameters including the PID constants $K_p$, $K_i$, etc., may be tuned to provide a desired response to changes in set point. Various characteristics of the controller that may be tuned include, but are not limited to, rise time, maximum overshoot/undershoot, settling time, etc.

In calibration step 40, having tuned the sensor and controller for a desired dynamic response, and having obtained the composite gain CDA' for various set points, the mass flow controller undergoes a calibration step to ensure that the mass flow controller has a satisfactory steady-state response. The mass flow controller is calibrated, in part, such that the relationship between actual fluid flow and indicated flow is linear. In addition, configuration data may be obtained that facilitates the configuration of the mass flow controller on a process fluid and/or process operating conditions as described in calibration step 40 of FIG. 7b.

In step 41 of calibration step 40, a full scale range is defined for the mass flow controller. According to one embodiment, the actual fluid flow is measured corresponding to a sensor output of 1.0. An approximate linearization curve is provided such that at the defined full scale flow, indicated flow will have a value at or near 1.0. The approximate linearization curve is then applied to the flow meter 110. It should be appreciated that the values of 1.0 for maximum sensor output and indicated flow are exemplary and may be replaced with any desired number.

In step 43, a first set point $_{cb}S_0$ is chosen from a set of selected set points $\{_{cb}S_0, _{cb}S_1, _{cb}S_2, \ldots\}$ and applied to the mass flow controller. The actual fluid flow in the flow path (e.g., flow path 103) resulting from the set point is then measured. Corresponding to each set point, the sensor output and actual fluid flow are recorded. It should be appreciated that fractional flow (i.e. actual fluid flow divided by the full scale range associated with the test fluid) may be recorded instead of actual fluid flow if more convenient, and that the relevant information is present in both representations. Steps 41 and 43 are then repeated for each of the sets points $_{cb}S_i$ in the set of selected set points, resulting in a set of point pairs {sensor output, actual fluid flow}$_i$ that may be stored as configuration data as illustrated in step 44 and 45.

The relationship between the point pairs {sensor output, actual fluid flow}$_i$ describes the non-linearities associated with the sensor and between the proportion of fluid flowing through the sensor conduit and through the mass flow controller at different flow rates. Accordingly, a linearization curve may be determined from these point pairs in order to ensure that the relationship between fluid flow and indicated flow is linear. In one embodiment, a set of points that corrects for the non-linearities associated with point pairs {sensor output, actual fluid flow}$_i$ is determined. A cubic spline is fit to the set of points such that a linearization curve that is continuous and passes through the point (0,0) (i.e., fluid flow=0 and sensor output=0) is provided. In step 46, the linearization curve is applied to the mass flow controller. It should be appreciated that a number of other curve fit methods may alternatively be used, including, but not limited to, piece-wise linear approximation, polynomial approximation, etc.

During steps 10–40, configuration data has been recorded from the various production steps of the mass flow controller on a test fluid and test operating conditions. The configuration data contains information that facilitates configuration of the mass flow controller for operation with a process gas and/or process operating conditions. It should be appreciated that the set of configuration data recorded during a manual tuning of a mass flow controller may differ depending on the particular implementation of the mass flow controller, and may differ from that illustrated in FIGS. 7c and 7d. Accordingly, configuration data for any particular implementation of a mass flow controller merely describes data obtained during production of a mass flow controller that facilitates the configuration of the mass flow controller for operation with a process fluid and/or process operating conditions.

For example, in the embodiment illustrated in FIGS. 7c and 7d, the configuration data recorded during steps 10–40 includes sensor tuning parameters, the single gain from the sensor tuning step, tuning conditions, calibration conditions, a set of point pairs {sensor output, CDA'}$_i$, a set of point pairs {sensor output, actual fluid flow})$_i$, and a full scale range for the test fluid.

In the valve characterization step 20, the point pairs {sensor output, CDA'}$_i$ were recorded. As discussed above, the composite gain term CDA' is the product of the gain terms associated with the valve actuator, the valve and the flow meter, respectively. However, the individual contributions of gain terms C, D and A' to the composite gain term CDA' are unknown. Also, it is noteworthy that A' is only a portion of the total gain term A associated with the flow meter.

In system gain decomposition 50, the individual gain terms that contribute to the composite gain term CDA' are isolated from the composite gain term in order that they may be determined for a process fluid and/or process operating condition in the succeeding system configuration step 60. However, it should be appreciated that steps 51–56 may not be necessary for certain implementations of a mass flow controller where, for instance, an accurate model of a valve actuator is available, or the gain associated with the actuator for a set of process operating conditions may be directly obtained. As discussed above, system gain decomposition 50 provides a more general method of modeling the behavior of the valve actuator (e.g., a method of obtaining gain term C for a set of process operating conditions.)

In step 51 gain term A is determined. In the previously described embodiment, the flow meter has been tuned and/or calibrated such that 25% of full scale flow results in an indicated flow of 0.25, 50% of full scale flow results in an indicated flow of 0.5, 75% of fill scale flow results in an indicated flow of 0.75 etc. The relationship between the fluid flow in the flow path and the indicated flow is linear, hence the gain associated with the flow meter (i.e., gain A) is a constant.

Accordingly, gain A can be directly determined in step 51 by dividing indicated flow by fluid flow at any desired point, the simplest being full scale flow and the associated indicated flow of 1 ensured by the linearization curve. Thus, in embodiments wherein the maximum indicated flow is unity, gain A is equal to the reciprocal of full scale range (i.e., the value of full scale flow through the mass flow controller for a particular fluid species). In general, gain A is equal to the maximum indicated flow value divided by the full scale range associated with a particular fluid species.

In step 52, composite gain term CDA is formed. Gain term A' is the gain associated with the flow meter without the contribution of the linearization curve while gain term A is a gain associated with the flow meter including the linearization curve. Therefore, the relationship between A' and A is by definition the linearization curve. Hence, the composite gain term CDA can be directly determined by adding in the contribution of the linearization curve, which is to say, by multiplying CDA' by the gain term associated with the linearization curve (e.g., multiplying CDA' by the derivative of the linearization curve). In each iteration of step 52, gain term $CDA_i$ is formed at set point $_dS_i$ and provided to step 53.

In step 53, the contribution of gain term A is removed. Since both the composite gain term CDA and the individual gain term A (the reciprocal of full scale range) are now known, the contribution of gain term A can be divided out from composite gain term CDA, leaving composite gain term CD associated with the valve actuator and the valve. As illustrated in step 53, gain term $CD_i$ is formed at set point $_dS_i$ and provided to step 54.

As discussed in the foregoing, gain C is the change in valve displacement divided by the corresponding change in the drive signal (e.g., DS provided by the GLL controller). Gain D is the change in fluid flow divided by the corresponding change in valve displacement.

In step 54, gain term D is determined and valve displacement is calculated at a selected set of set points. In order to further differentiate composite gain term CD, a physical model of the valve is employed to determine the valve displacement necessary to achieve a particular fluid flow under a particular set of operating conditions (i.e., to determine gain D). One physical model of the valve that may be used to make this determination is illustrated and described in Section D. below, entitled "Physical Valve Model". It should be appreciated that different valves and valve types may have different physical models. Furthermore, there may be more than one physical model that may be used to model the characteristics of any particular valve. Accordingly, the present invention is not limited to any particular valve model.

In one embodiment, gain D is determined by calculating the valve displacement necessary to achieve each fluid flow represented by a set of selected set points $\{_dS_0, _dS_1, _dS_2, \ldots\}$. A deviation n may be chosen and the gain term D determined by calculating the valve displacement at $_dS_i-n$ and $_dS_i+n$ and forming the ratio of change in set point to change in valve displacement (e.g., 2n/Δdisplacement). Additionally, the displacement at $_dS_i$ may be determined or the values of displacement at $_dS_i-n$ and $_dS_i+n$ averaged in order to determine a displacement$_i$ at $_dS_i$. As illustrated, in each iteration of step 54, gain term $D_i$ and the displacement$_i$ of the valve at set point $_dS_i$ are determined.

In step 55, gain term D is divided out of composite gain term CD, thus isolating gain term C. In addition, a set of point pairs {C, displacement}$_i$ is generated to provide a model of the behavior of the actuator with the set of test operating conditions used during production 710. It is known that gain term C (the gain associated with the valve actuator) is not usually directly dependent on process fluid and/or process operating conditions, though it may be a function of valve displacement. In each iteration of step 55, the gain term $C_i$ is formed by removing the contribution of gain term $D_i$ for displacement$_i$ calculated at set point $_dS_i$ and stored in the set {C, displacement}$_i$ Steps 52–55 are repeated for each of the selected set points $_dS_i$ such that a set of points pairs {C, displacement}$_i$ is generated that provides information about the behavior of the valve actuator under the set of test operating conditions to the succeeding configuration step.

In system configuration step 60, control parameters are determined for a process fluid and/or process operating conditions. The physical model considers fluid species, inlet and outlet pressure, temperature, etc. Accordingly, gain D can be calculated for a process fluid and/or process operating conditions by providing the fluid species information and process operating conditions to the physical model and calculating the displacements necessary to achieve the various representative fluid flow values. From the displacements determined from the physical model of the valve and model of the behavior of the valve actuator, gain term C may be calculated for the process fluid and/or process operating conditions. In one embodiment, the model of the behavior of the actuator is the point pairs {C, displacement}$_i$ generated in system gain decomposition step 50. However, in embodiments where the behavior of the valve is known or can be directly measured, gain C can be directly determined from the valve. Thus, having obtained both gain terms C and D, the composite gain term CD may be formed. Subsequently, gain A can be calculated by determining a full scale range for the process fluid. Accordingly, the system gain term CDA can be determined for the process fluid and/or process operating conditions.

The reciprocal of the system gain term may be formed and applied to a control loop of a GLL controller (e.g., gain term G). It should be appreciated that G may be a function of one or more operating conditions of the mass flow controller, such as set point, inlet and/or outlet pressure, temperature, etc. Reciprocal gain term G may be applied to the GLL controller such that the control loop of the mass flow controller has a constant loop gain with respect to at least the one or more operating conditions of which G is a function. Hence, the mass flow controller has been configured to operate on a process fluid and/or process operating conditions, as discussed further in detail below.

In step 61, a full scale range associated with a process fluid with which the mass flow controller is to be configured is determined. One method of determining full scale range is to calculate a conversion factor based on the specific heat ratios of the process fluid and the test fluid times the full scale range associated with the test fluid. It should be appreciated that other methods may be appropriate for calculating a full scale range associated with a particular process fluid. For example, the full scale range associated with a particular process fluid may be directly measured if appropriate.

In step 62, gain term D is determined for a process fluid and/or process operating conditions from a physical model of the valve by applying process fluid species information and/or process operating conditions to the physical model and calculating the displacement necessary to achieve a set of representative flow values $\{_{cf}S_0, _{cf}S_1, _{cf}S_2, \ldots\}$. As discussed above, gain D may be determined by choosing a deviation n and calculating the valve displacement at $_{cf}S_i-n$ and $_{cf}S_i+n$ and forming the ratio of change in set point to change in valve displacement (e.g., 2n/Δdisplacement). Additionally, the displacement at $_{cf}S_i$ may be determined or the values of displacement at $_{cf}S_i-n$ and $_{cf}S_i+n$ averaged in order to determine a displacement$_i$ at $_{cf}S_i$. Accordingly, in each iteration of step 62, gain term $D_i$ and displacement$_i$ of the valve at set point $_{cf}S_i$ are determined for the process fluid and/or process operating conditions.

In step 63, gain term C is determined for a process fluid and/or process operating conditions. In some embodiments of the present invention gain C may be directly measured from the actuator itself. Alternatively, gain term C may be determined from the information stored in the point pairs $\{C, displacement\}_i$ generated in system gain decomposition step 50. In either case, in each iteration of step 63, $C_i$ is determined at displacements corresponding to set point $_{cf}S_i$ for the process fluid and/or operating conditions.

In step 64, gain term D is multiplied with gain term C to produce composite gain term CD. As illustrated, in each iteration of step 64, the product of gain term $C_i$ from step 53 and gain term $D_i$ from step 52 is taken to form composite gain term $CD_i$ at set point $_{cf}S_i$.

In step 65, the contribution of gain term A is removed. Since gain term A is simply the reciprocal of full scale range, composite gain term CD can be divided by the process full scale range associated with the process fluid to form system gain term CDA. As illustrated, in each iteration of step 65, composite gain term $CD_i$ is divided by the full scale range to form system gain term $CDA_i$ at set point $_{cf}S_i$.

In step 66, the reciprocal of system gain term CDA is calculated to form reciprocal gain term G. As illustrated, in each iteration of step 66, the reciprocal $CDA_i$ is formed and the resulting $G_i$ at set point $_{cf}S_i$ is provided to block 67 to form reciprocal gain term G. It should be appreciated that gain term G may be represented by any number of techniques. For example, a curve may be fit to the points $G_i$, the points $G_i$ may be stored in a look-up table, or gain term G may be represented in any manner discussed above in connection with the definition of a gain term, or otherwise. In addition, gain term G may be a function of one or more operating conditions. In the embodiment illustrated in FIG. 7f, gain term G is a function of set point. However, gain G may additionally be a function of more than one operating condition depending on the needs of a particular implementation of a mass flow controller.

Steps 62–66 are repeated for each of the selected set points $\{_{cf}S_0, _{cf}S_1, _{cf}S_2, \ldots\}$ in order to determine reciprocal gain term G for the process fluid and/or process operating conditions with which the mass flow controller is being configured to operate.

In step 68 reciprocal gain term G is applied to a control loop of the mass flow controller to provide a constant loop gain with respect to at least set point. In general, gain term G will provide a constant loop gain with respect to at least the operating conditions for which it is a function.

It should be appreciated that by determining the system gain of the mass flow controller based on information for the process fluid and/or process operating conditions, and by applying a reciprocal gain term of the system gain to a control loop of the mass flow controller, the mass flow controller has been configured for operation with the process fluid and/or process operating conditions. In other words, the mass flow controller will exhibit the same response observed after production of the mass flow controller with a test fluid and test operating conditions when operating with the process fluid and/or process operating conditions, that is to say, the mass flow controller, when operating with the process fluid and/or process operating conditions, will exhibit a satisfactory response.

It should be appreciated that the process of configuring a mass flow controller may be automated through the use of a computer. For example, steps 50 and 60 may be controlled entirely by a program stored in memory and executed on a processor of a computer, such as a personal computer. Hence, a mass flow controller may be automatically configured for operation with arbitrary process fluids and/or process operating conditions.

The term automatic or automatically as used herein applies generally to a state of being enacted primarily by or under the control of a computer or processor. In particular, automatic tasks, steps, processes, and/or procedures do not require extensive operator involvement or supervision. Accordingly, an automatic configuration of a mass flow controller describes a configuration of a mass flow controller for operation with a process fluid and/or process operating conditions that does not require manual involvement. Configuration of a mass flow controller under the control of a computer program is to be considered an automatic configuration.

It should be appreciated that routine tasks such as connecting a mass flow controller to a computer or processor, initiating the execution of a program, etc. are, in general, done manually. However, such tasks are considered routine and may be part of an automatic configuration of a mass flow controller.

Figure 14:
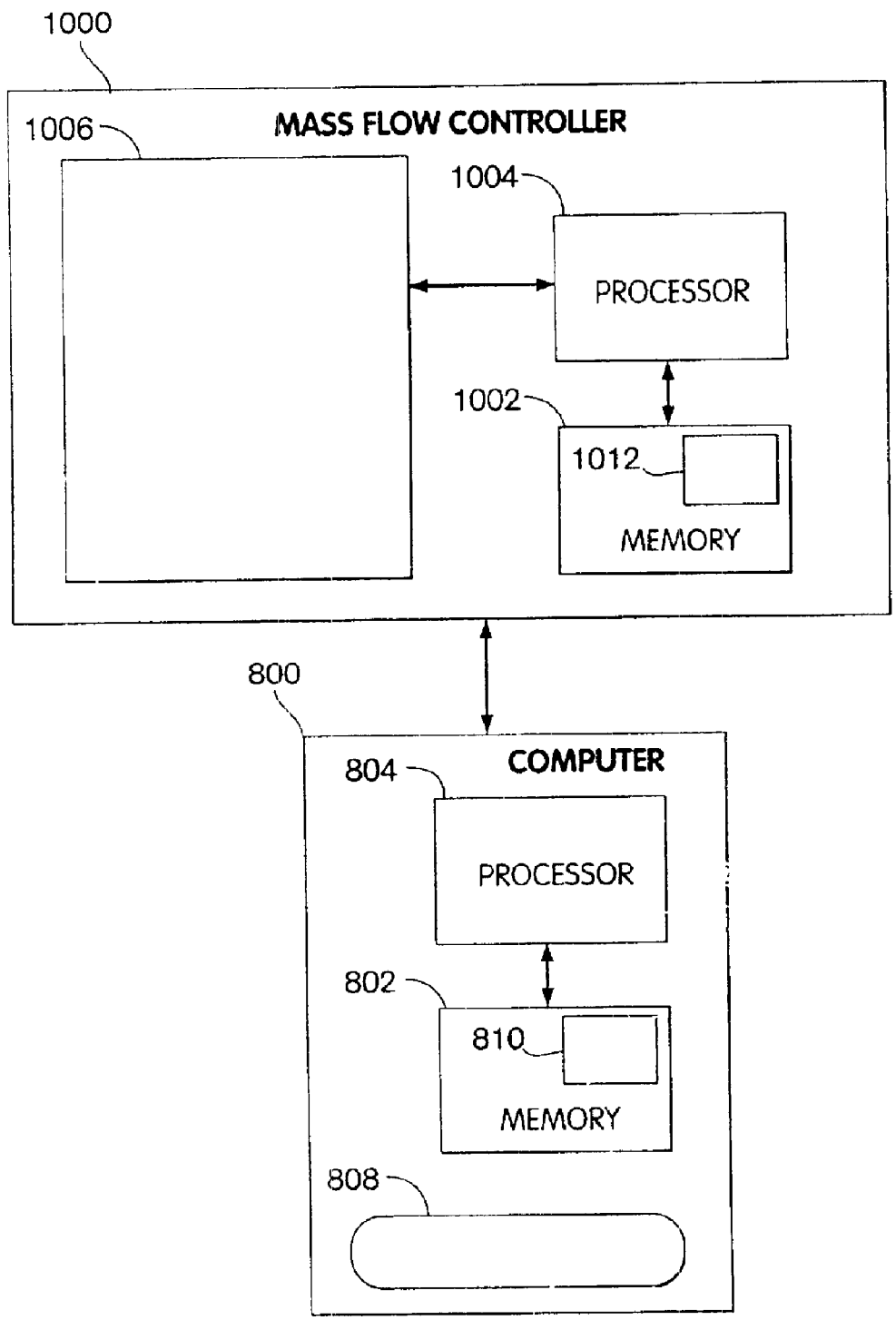
FIG. 14 illustrates an embodiment of the present invention including a computer and a mass flow controller wherein the mass flow controller may be automatically configured by a computer.

FIG. 14 illustrates a system that facilitates automatic configuration of a mass flow controller on arbitrary process fluids and/or process operating conditions. The system includes a mass flow controller 1000 and a computer 800.

The mass flow controller 1000 includes a memory 1002, a processor 1004, and the various components of the mass flow controller 1006 illustrated and described with respect to FIG. 1. The processor is coupled to the memory and may be connected to at least some of the components of the mass flow controller. As described above, operation of a mass flow controller may be implemented under the control of a processor, such that the GLL controller 150 is implemented by the processor 1004. The mass flow controller 100 further includes configuration data 1012 obtained during production of the mass flow controller and stored in memory 1002.

The computer 800 includes a memory 802, a processor 804, an input device, and a program 810 stored in memory 802. The program 810 includes instructions, that when executed on processor 804, carry out various steps involved in configuring a mass flow controller for operation on a process fluid and/or process operating conditions (e.g., step 712 in FIG. 7a, steps 60 and 70 in FIGS. 7b, 7e, and 7f, etc.).

It should be appreciated that computer 800 may be any of a number of computing devices known in the art. For example, computer 800 may be a personal computer, a laptop, a hand held device, or any other computing device capable of executing a program. Furthermore, computer 800 may be connected to and communicate with the mass flow controller in any number of ways known in the art. For example, computer 800 may be connected via a cable using any number of standard communication methods including, but not limited to, standard parallel port communication, serial port communication, Universal Serial Bus (USB), etc. Alternatively, the computer 800 may have a wireless connection with the mass flow controller. Accordingly, it should be appreciated that the present invention is not limited to a particular type of computing device, input device, connection type, or communication method, as a variety of types of computing devices, connection types, and communication methods may suitably be used.

According to one embodiment of the present invention, the computer 800 may be connected to the mass flow controller in order to configure the mass flow controller on a process fluid and/or process operating condition. The program 810 may then be executed on processor 804.

Configuration input may be provided to the input device 808. The configuration input may include, but is not limited to, process fluid species information, process operating conditions, and/or other information relevant to the configuring of the mass flow controller. The input device may be any of a number of devices capable of receiving information, including, but not limited to, a keyboard or keypad, interface software for receiving input from a mouse, pointer, etc.

The program 810 may then obtain configuration data 1012 stored in memory 1002 of the mass flow controller. From the configuration data and configuration input, program 810 determines control parameters for the mass flow controller that facilitate operation of the mass flow controller with the process fluid and/or process operating conditions. The program 810 may then apply the control parameters to the mass flow controller by either modifying existing control parameters accordingly, or by adding additional control parameters to the mass flow controller. In this manner, the mass flow controller may be automatically configured for operation with the process fluid and/or process operating conditions.

Figure 15:
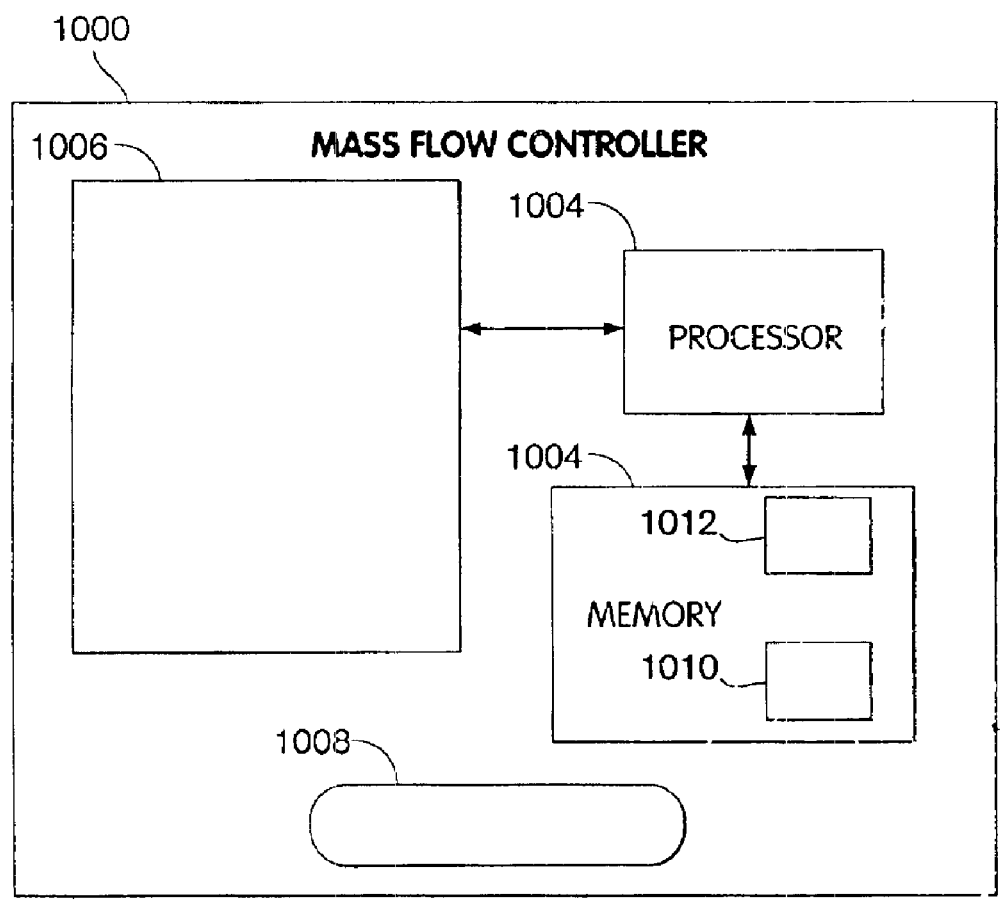
FIG. 15 illustrates an embodiment of the present invention showing a mass flow controller that is auto-configurable.

In an alternative embodiment illustrated in FIG. 15, the program 810 may be stored in memory 1002 of the mass flow controller and may be executed on processor 1004 which may also be used to implement the GLL controller 150. An input device 1008 may be added to the mass flow controller to enable the mass flow controller to receive configuration input. Accordingly, the mass flow controller 1000 illustrated in FIG. 15 is auto-configurable.

C. Hysteresis Reduction

It is often the case that mass flow controllers experience instability associated with the operation of its individual components. For example, mass flow controllers employing solenoid actuated valves are susceptible to imprecision due to hysteresis effects associated with the magnetics of the solenoid.

One embodiment of the present invention provides a method of reducing hysteresis in a solenoid device by applying a non-operational signal to a solenoid actuated device.

The term non-operational signal, when applied to solenoid actuated devices, describes a signal applied to the device that is incapable of actuating the device. For instance, in a solenoid actuated valve, a non-operational signal may refer to a signal having insufficient magnitude to displace the controlled portion of the valve (i.e., the plunger). It should be appreciated that the non-operational signal may be the same signal as the control or drive signal of the device only reduced such that it is insufficient to actuate the device.

Figure 8:
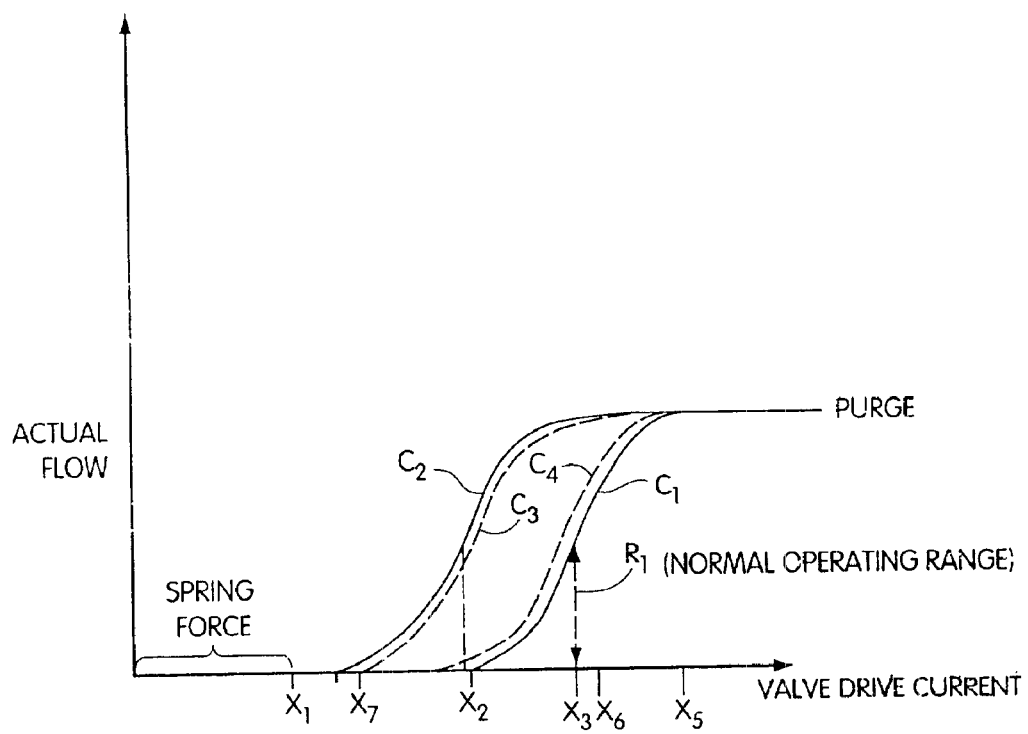
FIG. 8 illustrates the principle of hysteresis in a normally-closed solenoid actuated control valve of a mass flow controller according to the prior art.

FIG. 8 graphically illustrates the principle of hysteresis in a solenoid actuated control valve of a mass flow controller that is normally in a closed position (i.e., the default position the valve is closed, referred to herein as a normally closed valve). In FIG. 8, control valve drive current is plotted along the horizontal axis and fluid flow through the control valve is plotted along the vertical axis. Although FIG. 8 is specifically directed to a solenoid actuated control valve in a mass flow controller, it will be appreciated that it is representative of solenoid actuated devices in general, as the horizontal axis generally corresponds to the amount of energy provided to the solenoid actuated device, and the vertical axis generally corresponds to positional displacement of the solenoid actuated device.

As shown in FIG. 8, as valve drive current is increased, the actual flow of fluid through the control valve does not begin to increase until after an amount of drive current sufficient to overcome a spring force of a spring that biases the control valve in a closed position is provided. The amount of drive current necessary to overcome this spring force is denoted in FIG. 8 by the point $X_1$. Under normal operating conditions, actual fluid flow through the control valve starts to increase at some point after the point $X_2$. As shown by the curve labeled $C_1$, as the valve current is increased beyond the point $X_2$, the actual flow through the control valve increases in a proportional but non-linear manner, with the portion of curve $C_1$ that is labeled $R_1$ representing the typical operating range of a normally-closed control valve in a mass flow controller.

Although FIG. 8 is not drawn exactly to scale, the operating range of a normally-closed control valve of a mass flow controller typically represents a displacement of the control valve from its closed position of approximately several microns for low-flow mass flow controllers up to several hundred microns for high-flow mass flow controllers. It should be appreciated that the operating range will depend on the flow requirements of a particular mass flow controller.

In the embodiment illustrated in FIG. 8, valve drive currents above the point $X_3$ represent operation of the mass flow controller outside its operating range (e.g., the range of mass flow rates over which the mass flow controller is designed and/or calibrated to operate), with the full open position of the control valve (i.e., above point $X_5$) representing a purge mode of the mass flow controller in which the displacement of the control valve (from its closed position) is on the order of approximately 250 microns for low to moderate flow mass flow controllers. It should be appreciated that while the full open position of the control valve is a position at which the mass flow controller is intended to operate, it is not a position at which the mass flow rate of the fluid flowing therethrough can be accurately controlled and/or monitored. Accordingly, as used herein, when used in connection with a mass flow controller, the term operating range is defined to mean that range of positional displacement over which the mass flow rate of fluid flowing through the control valve can be accurately controlled and monitored.

As can be seen in FIG. 8, when the control valve is brought to its full open position and then the valve drive current is decreased, the actual flow of fluid through the control valve versus drive current no longer follows curve $C_1$, but instead tends to follow a different curve $C_2$. Thus, as valve current is decreased from the point $X_5$, the actual fluid flow through the control valve does not begin to decrease until approximately point $X_6$, whereupon the actual flow of fluid versus valve drive current then decreases in a proportional (but again, non-linear manner) following curve $C_2$.

If, after operating the control valve in this manner (i.e., operating the control valve first along curve $C_1$ and then returning the control valve to its off position along curve $C_2$), it is then desired to resume normal operation, the actual flow of fluid through the control valve does not again follow curve $C_1$, but instead, will follow yet a different curve $C_3$ positioned somewhere between curve $C_1$ and $C_2$. In fact, where curve $C_1$ represents a plot of drive current versus actual flow for a previously unmagnetized solenoid control valve, and curve $C_2$ represent a plot of drive current versus actual flow for a highly magnetized solenoid control valve (e.g., after returning the control valve to its off position along curve $C_2$), the curve $C_3$ will be positioned more closely to curve $C_2$, as shown. Thus, instead of actual fluid flow commencing at the point $X_2$, fluid flow will instead commence at about point $X_7$. If the control valve is operated within its normal operating range along curve $C_3$ and returned to a closed position, the next time that the valve is opened, the actual flow of fluid through the control valve versus valve drive current will follow yet a different curve (e.g., curve $C_4$), which is one of a family of curves between curve $C_1$ and curve $C_2$. Whether curve $C_4$ is positioned closer to curve $C_1$ or to curve $C_2$ will depend upon the operation history of the valve including the highest point on the curve $C_3$ at which the control valve is operated during that operational cycle. The above-described operation of the control valve in which the present state of operation is dependent upon its prior operating state is termed hysteresis.

Consequently, hysteresis adversely affects the ability to accurately predict the drive level at which the valve will first permit flow after each operation cycle, as it depends on the operation history of the valve during the operation cycle. As described above, a pedestal is set to just below the drive level at which the valve will begin to permit flow. However, the uncertainty caused by hysteresis with respect to that drive level adversely effects the accuracy with which the pedestal may be set. Setting the pedestal too high may result in undesirable overshoot. Setting the pedestal too low may result in a slow response time when transitioning from zero flow to controlled flow.

FIGS. 9–13 graphically illustrate a number of different waveforms that may be used as non-operational signals to reduce the effect of hysteresis in a solenoid actuated device. Each of these non-operational signals may be provided as a drive signal to the solenoid actuated device. For example, in the mass flow controller of FIG. 1, such non-operational signals may be provided by the GLL controller 150 to the valve actuator 160 to reduce hysteresis.

Figure 9:
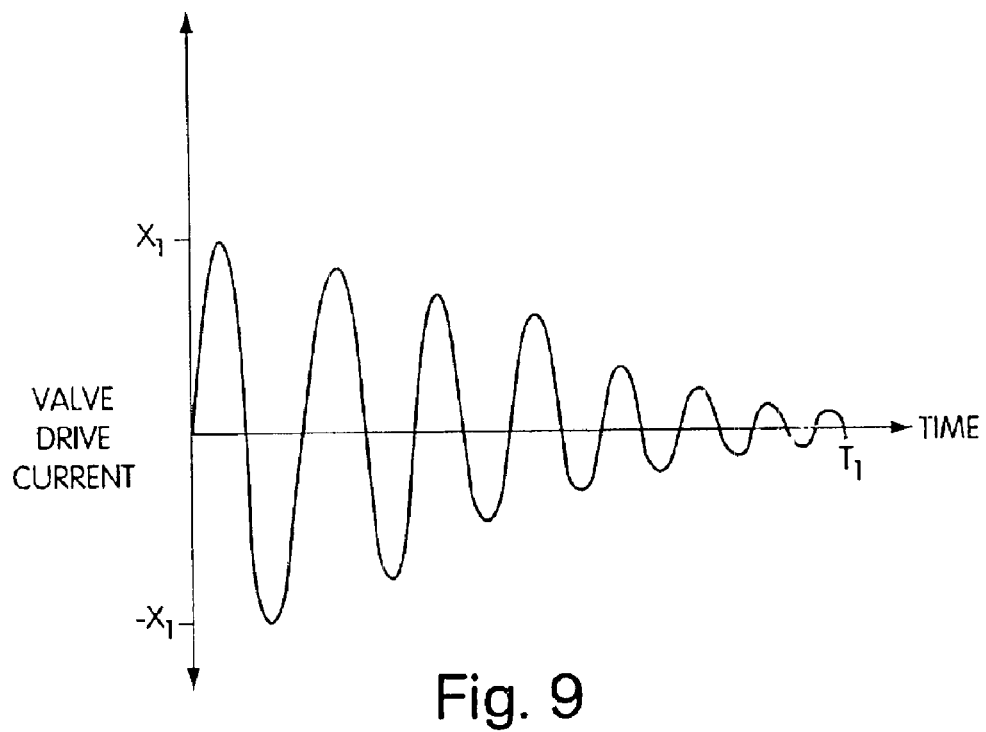
FIG. 9 illustrates a diminishing amplitude sinusoidal-shaped signal that may be provided to a solenoid actuated control valve to mitigate the effects of hysteresis according to an embodiment of the present invention.

With reference to FIG. 9, a time-varying sinusoidal signal may be provided to a solenoid actuated valve or other device to mitigate the effects of hysteresis. As shown in FIG. 9 a sinusoidal wave form may be provided that diminishes in the amplitude over a time period $T_1$. Where the solenoid actuated device is a control valve of a mass flow controller, the amplitude of the sinusoidal signal should be less than the amount of current that is needed to open the solenoid actuated valve. For example, in a mass flow controller that utilizes a normally closed position solenoid actuated valve, the maximum value of the non-operational signal should be less than the minimum amount of current needed to overcome the spring force and open the valve. Thus, referring back to FIG. 8, the maximum value of the signal would be less than $X_1$ to ensure that no fluid can pass through the valve during the provision of the waveform.

As illustrated in FIG. 9, the time varying waveform diminishes in amplitude over a time period $T_1$. Empirical results have demonstrated that a waveform of approximately 10 to 20 cycles is sufficient to precondition a typical solenoid actuated valve to a predetermined state, regardless of its prior state of operation (i.e., whether it was operated within its normal operating range or outside the normal operating range such as in a purge mode). Where the solenoid actuated control valve is a valve that is normally in an open position, the waveform should be such that the valve is in a closed position throughout the procedure to prevent the flow of fluid through the valve.

In general, the frequency chosen for a particular waveform may depend on various constraints of an implementation. For example, the frequency that can be delivered to the solenoid actuated device may be limited by power constraints. Additionally, a lower bound may be imposed on the frequency by the time that the solenoid actuated device may remain closed. However, in general any frequency within the constraints of a particular implementation that provides a desired number of cycles is suitable. For example, a signal provided in the range between 10–20 cycles has been shown to produce a reduction in the effects of hysteresis described herein, however, said range is not limiting.

Although it is believed that the time varying waveform illustrated in FIG. 9 is best suited to reducing the effects of hysteresis in a solenoid actuated device, empirical results have determined that a variety of other waveforms may be used to set the solenoid actuated device to a predetermined state. Generally, each of these waveforms provide a time varying signal to the solenoid actuated device that diminish in amplitude over time.

However, empirical results have also demonstrated that it is not necessary to use a time varying waveform that diminishes in amplitude, as a constant amplitude time varying signal may also be used.

Figure 10:
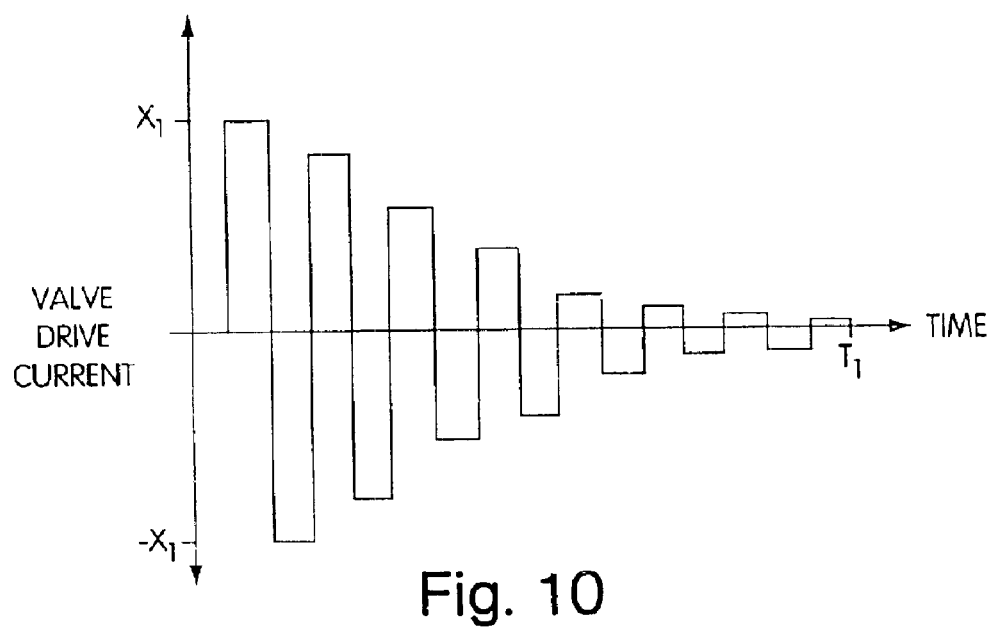
FIG. 10 illustrates a diminishing amplitude square-shaped signal that may be provided to a solenoid actuated control valve to mitigate the effects of hysteresis according to another embodiment of the present invention.

FIG. 10 illustrates another time varying current waveform that may be used to reduce or eliminate magnetically induced hysteresis in a solenoid actuated control valve or other solenoid actuated device. As in FIG. 9, the time varying waveform diminishes in amplitude over a time period $T_1$ and has a maximum amplitude that is less than the magnitude of the control signal necessary to permit fluid to pass through the valve. As with the time varying waveform of FIG. 9, the time period $T_1$ may be on the order of approximately 1 second to avoid interfering with normal operation. However, rather than a sinusoidal waveform, a square waveform is provided. Based upon empirical testing, it is believed that other time-varying waveforms may be provided, such as saw-tooth wave forms, etc. It should be noted that each of the waveforms illustrated in FIGS. 9 and 10 is capable of providing positive and negative values to the solenoid actuated device. In general, such a waveform that includes both positive and negative values is preferred for setting the solenoid actuated device to a predetermined state, as it effectively discharges the residual magnetism of the magnetic core of the solenoid actuated device imposed during operation.

Figure 11:
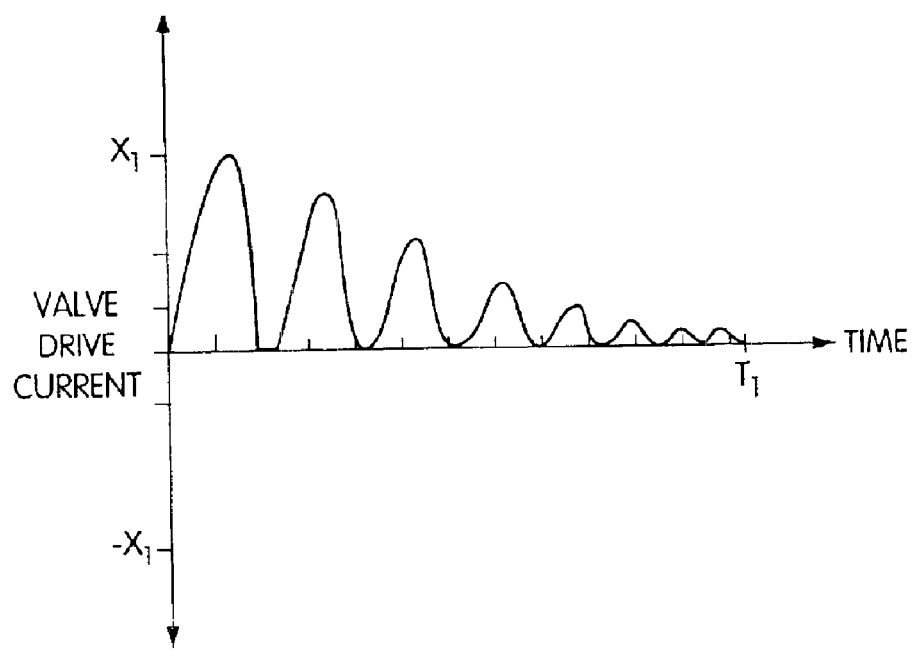
FIG. 11 illustrates yet another diminishing amplitude sinusoidal-shaped signal that may be provided to a solenoid actuated control valve to mitigate the effects of hysteresis according to another embodiment of the present invention.
Figure 12:
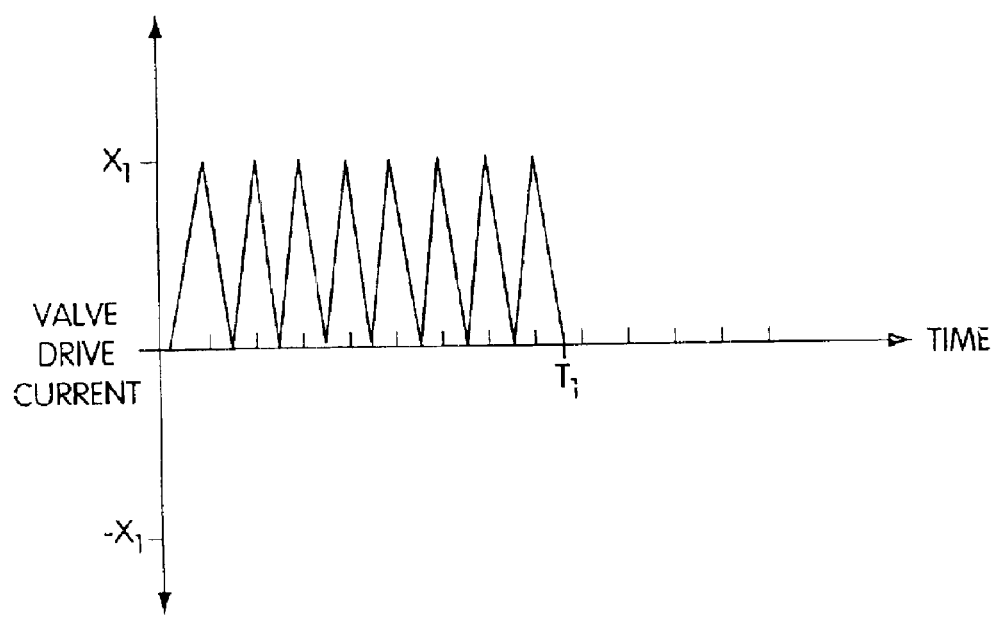
FIG. 12 illustrates a constant amplitude saw-shaped signal that may be provided to a solenoid actuated control valve to mitigate the effects of hysteresis according to another embodiment of the present invention.

FIGS. 11 and 12 show alternative waveforms that may be used to reduce or eliminate hysteresis in a solenoid actuated control valve. The waveform illustrated in FIG. 11 again has a diminishing amplitude over a time period $T_1$. However, in contrast to the waveform illustrated in FIGS. 9 and 10, the time varying waveform depicted in FIG. 11 includes only positive values. Depending upon the particular circuit in which the solenoid actuated control valve is used, one may not have the ability to provide a signal that assumes both positive and negative values.

FIG. 12 illustrates a time variant waveform that may also be used to reduce or eliminate hysteresis in a solenoid actuated control valve. Although a triangle-shaped waveform is illustrated, it should be appreciated that a sinusoidal waveform, a square wave, or a number of alternatively shaped waveforms may be used.

It should be appreciated that in each of FIGS. 9–12, the maximum amplitude of the time varying waveform is such that it is incapable of actuating the solenoid actuated control valve, as the maximum amplitude is less than the magnitude of the control or drive signal required to overcome the spring force and open the valve. Applicants have found that time variant current wave form illustrated in FIG. 12 is easily provided with existing components used in a mass flow controller and does not require any additional circuitry. Moreover, other time varying waveforms may also be provided, such as a square wave, a triangle, or a sawtooth shaped waveform.

As discussed above, it should be appreciated that the frequency and duration with which a waveform is provided to the solenoid actuated device is not limited to values used herein as examples to illustrate some values that both provide a suitable number of cycles and do not interfere with normal operation of the solenoid actuated device. Other values are suitable and are considered to be within the scope of the invention.

Figure 13:
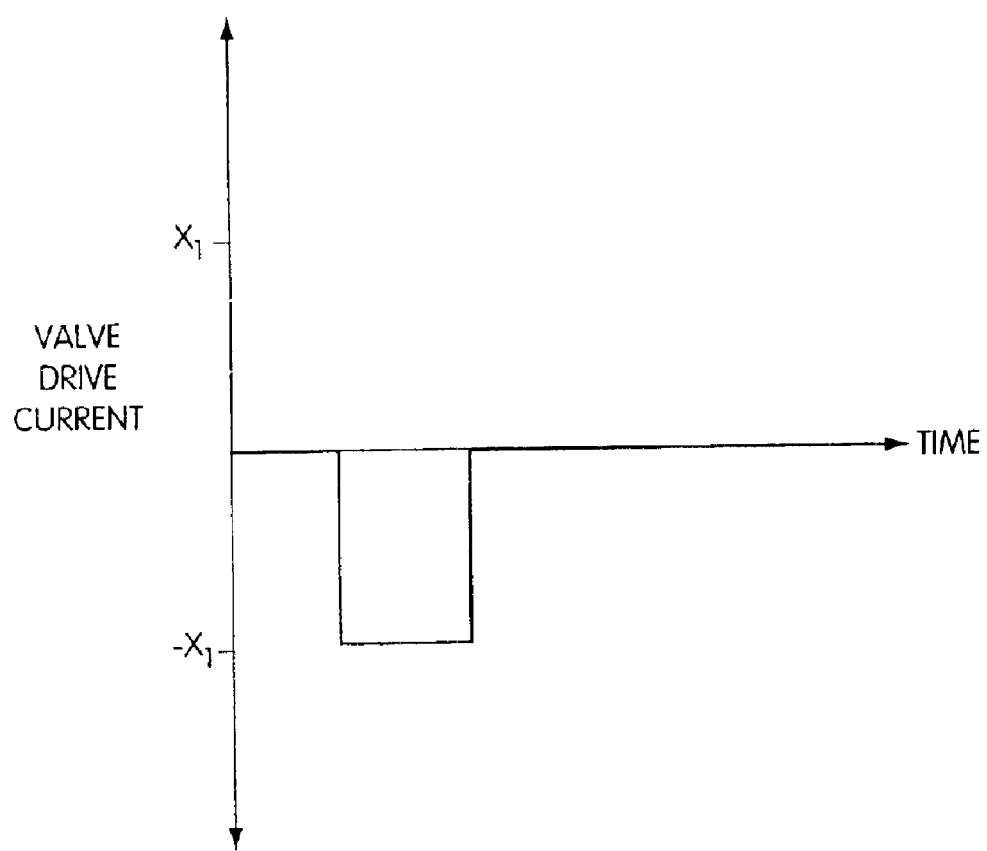
FIG. 13 illustrates a pulsed signal that may be provided to a solenoid actuated control valve to mitigate the effects of hysteresis according to yet another embodiment of the present invention.

FIG. 13 illustrates an alternative waveform that may be used to set a solenoid actuated device to a particular predetermined state after each cycle of operation. As shown in FIG. 13, a negatively valued pulse is applied to the coil of the solenoid actuated valve. When used in conjunction with a mass flow controller, the sign of the pulse should ordinarily be opposite to that which is normally used to open or purge the solenoid actuated control valve, and of a magnitude that is incapable of activating the valve. For example, with a normally closed solenoid actuated control valve, this would correspond to the negative going pulse. It should be appreciated that the pulse of current that is applied should be such that it is opposite in polarity to that required to purge the mass flow controller. In the case of solenoid actuated device in general, the pulse should be of a polarity that is incapable of actuating the solenoid actuated device, and preferably one that is opposite to the polarity of the normal drive signal.

It should be appreciated that the non-operational signal can be a current, voltage or otherwise. Accordingly, the waveforms illustrated in FIGS. 9–13 and described herein are considered to be time varying waveforms of the particular form used in any particular implementation (e.g., a time varying current waveform, a time varying voltage waveform etc.).

Each of the above described drive signal waveforms is capable of setting a solenoid actuated device, such as a control valve to a predetermined state. Accordingly, referring back to FIG. 8, it is known to which curve C that the actuated device will operate on. Thus, imprecision due to the operation of the device on any of a family of curves $C_i$ is reduced or eliminated.

It should be appreciated that while it may not be necessary to set the solenoid actuated device to the predetermined state after each cycle of operation, it is preferable to do so. For example, even if the solenoid actuated device has not been operated outside its normal operating range, the solenoid actuated device may still be affected by hysteresis due to the history of operation of the device within its normal operating range. In addition, because detecting when the solenoid actuated device is operated outside of its normal operating range can require additional code and/or detection circuitry, it is generally preferred to set the solenoid actuated device to the same predetermined state after each cycle of operation, irrespective of whether the prior cycle was within or outside the normal operating range. In this manner, the solenoid actuated device will be conditioned to follow a particular curve during operation, irrespective of its prior state of operation.

It should be appreciated that non-operational signals may be provided in a number of ways and the present invention is not limited to any particular implementation. For example, various waveforms (e.g., the waveforms illustrated in FIGS. 9–13) may be generated by the control and control electronics of a mass flow controller (e.g., GLL controller 150) and converted into a non-operational signal by the valve actuator and provided to the valve in order to reduce hysteresis. Alternatively, a function generator may be coupled to the valve or valve actuator in order to provide a non-operational signal to reduce hysteresis. Waveforms generated by any suitable means may be in digital or analog form and may be converted appropriately according to the needs of a particular implementation. Indeed, many techniques for generating suitable signals are known in the art and are considered within the scope of the present invention.

D. Physical Valve Model

According to another aspect of the present invention, Applicants have physically modeled the flow of fluid at different inlet and outlet pressures as predominately consisting of two components: the viscous pressure drop and the inviscid (dynamic) pressure drop. By summing the contributions of each of these components where the effective displacement of the valve for each component is equal, the effective displacement of the valve may be empirically determined using the following methodology. As noted above, the determination of the effective displacement of the valve at a particular fluid flow rate on a particular fluid enables the gain term associated with the valve (e.g., gain term D) to be determined, and thus the determination of the gain term associated with the valve actuator (e.g, gain term C).

Figure 16:
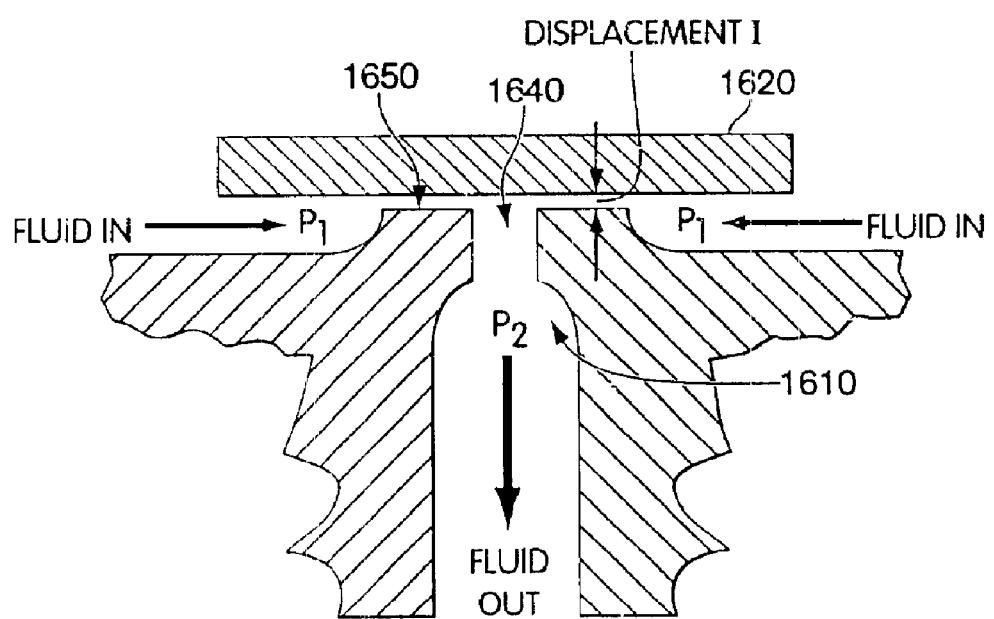
FIG. 16 illustrates a cross-sectional view of a valve.

Referring to FIG. 16, allowing the upstream or inlet pressure to be represented by $P_1$ and the downstream or outlet pressure to be represented by $P_2$, then at a mass flow rate represented by Q, the valve-lift is represented by H, and the viscous effect alone reduces the pressure from $P_1$ to some intermediate pressure $P_x$. The inviscid compressible flow further reduces the pressure from an intermediate pressure $P_x$ to $P_2$. Modeling the viscous pressure drop across the valve 170 based upon a physical model of viscous flow of fluid between two parallel plates (e.g., between the valve seat and the jet surface), the distance H between the two parallel plates (e.g., the displacement of the valve 170) is provided by the following equation:

$$H^3 = \frac{24 \cdot \mu Q L R T}{w(P_1^2 - P_x^2)} \cdot 1.654 \times 10^{-18} \ (\text{ft}^3) \qquad \text{(equation 1)}$$

where:

$P_1$, $P_x$: Pressure upstream and downstream of the viscous surface (psi);

Q: Mass flow rate (sccm);

L: length of the flow path (ft);

H: distance between the two parallel surfaces (ft);

w: the breadth of the flow path, w equals $\pi \cdot \phi$ and $\phi$ is the mean diameter of plateau 1650, $\phi$ is equal to 0.040" based upon the tested valve;

$\mu$: dynamic viscosity of the gas (centi-Poise);

T: Absolute temperature (deg. Rankine);

$\hat{R}$: universal gas constant, 1545.33 (ft-lbf/lb-mole-deg. R); and

R: gas constant (ft-lbf/lbm-deg. R).

Modeling the inviscid pressure drop across the valve 170 based upon a physical model of inviscid flow of fluid through an orifice or jet provides $$\frac{Q}{A} = 1.2686 \times 10^6 P_{x,0} \left(\frac{2}{\gamma+1}\right)^{\left(\frac{\gamma+1}{2(\gamma-1)}\right)} \sqrt{\frac{\gamma}{M_w T_{1,0}}} \quad \text{(equation 2)}$$

for choked flow; and:

$$\frac{Q}{A} = 1.2686 \times 10^6 P_{x,0} \left(\frac{P_2}{P_{x,O}}\right)^{\left(\frac{\gamma+1}{2\gamma}\right)}$$

$$\sqrt{\frac{2\gamma}{(\gamma-1)M_w T_{1,0}}\left\{\left(\frac{P_{x,O}}{P_2}\right)^{\left(\frac{\gamma-1}{\gamma}\right)} - 1\right\}} \quad \text{(equation 3)}$$

for unchoked flow; where the flow is choked if $$\frac{P_2}{P_{x,0}} \leq \left(\frac{2}{\gamma+1}\right)^{\left(\frac{\gamma}{\gamma-1}\right)} \quad \text{(equation 4)}$$

and unchoked otherwise, and where
Q=flow through the valve (sccm);
A=π·ø·H=valve effective area (sq. in,);
ø=diameter of orifice 1640;
$M_w$=gas molecular weight (gm/mol);
$P_{x,o}$=upstream total pressure (torr);
$P_2$=downstream static pressure (torr);
$T_{1,0}$=gas temperature (K);
γ=ratio of specific heats.

From the above viscous and inviscid equations, the effective displacement (i.e., H) of the valve 170 may be readily determined. Although some of the units used for the above inviscid calculations appear to be different from those used in the viscous calculation, there are no generic difference between the equations and the unit conversion factors were already built into the numerical constants in each equation.

To determine the effective displacement of the valve, assuming the measured mass flow rate to be Q and the measured upstream and downstream pressure to be $P_1$ and $P_2$ respectively, and neglecting the contribution of the velocity head to the total pressure, a method of calculating the effective displacement of the valve 170 may be performed. One exemplary method of calculating the effective displacement is to estimate the intermediate pressure Px by trial-and-error, where one calculates the values of H from both the viscous flow theory (Hv, Eq. 1) and the inviscid theory (Hi, Eq. 2 or 3), depending on whether the flow is choked or not, (Eq. 4). Thus, if the intermediate pressure is approximately twice the outlet pressure, choked flow may be assumed, and equation 2 is used for the inviscid component of the calculation, whereas if the inlet pressure is less than approximately twice the outlet pressure, equation 3 is used for the inviscid component of the calculation. For a given Q, P1, and P2, the correct Px is obtained when Hv and Hi become equal to each other. Thus, the computational scheme involves successive iteration to obtain $P_x$. The calculation begins by choosing $P_x$ to be mid-way between $P_1$ and $P_2$. Then the viscous valve-lift (Hv) and the inviscid valve-lift (Hi) are calculated. If it is determined that Hv is greater than Hi, meaning that there is not enough differential pressure for the viscous flow to deliver the required flow than for the inviscid flow, then during the next iteration a somewhat lower pressure $P_x'$ will be chosen, i.e., between the downstream pressure $P_2$ and the previous pressure $P_x$. The iteration continues until the two calculated valve-lift Hv and Hi come within 0.1% of each other. According to a further aspect of the present invention, this iterative process may be performed in software. The software for performing this iterative calculation may readily be performed by one of ordinary skill in the art and implemented on a computer. Accordingly, based upon the above method, the effective displacement of the valve 170 may be determined for each of a number of different flow rates.

As discussed previously, based upon empirical testing with a variety of different fluids or gases, Applicants have determined how the fractional contribution of the gain A of the mass flow meter changes from one gas to another, as it is primarily dominated by the specific heat of the fluid or gas being used. Accordingly, once the mass flow controller 100 has been calibrated with a known fluid or gas, how this gain changes for other types of gases is known. Further, the fractional contribution of the gain B of the GLL controller 150 is known to the mass flow controller 100, as the various constants that determine this gain may be stored in a memory of the mass flow controller 100, and the fractional contribution of the gain C of the valve actuator 160 is effectively constant or known. Accordingly, what remains is a way of determining how the fractional contribution of the gain D of the valve 170 and gas path changes for different gases and for different operating conditions, and how to compensate for changes in the range of the mass flow controller 100 for a different fluid or gas than that with which the mass flow controller 100 was initially calibrated.

According to a further aspect of the present invention, a method of configuring a mass flow controller that has been tuned at under known conditions and with a known fluid or gas is provided that may be used to tune the mass flow controller to have a nearly identical response on a different fluid or gas, or with a different operating range that that with which it was tuned. As discussed above, mass flow controller 100 is initially tuned on a known gas (for example, Nitrogen) with a known inlet pressure and a known outlet pressure. For simplicity, one embodiment of the present invention selects the known inlet pressure to be greater than two atmospheres and the outlet pressure at ambient. This selection of inlet and outlet pressure is advantageous for two reasons. First, use of inlet and outlet pressures relating to choked flow facilitate the physical modeling of the valve and valve gas path, as only choked flow conditions can be used for the inviscid pressure drop equations. Second, this type of operation (i.e., a pressure drop of approximately two atmospheres) is typical of the type of operation used by end-users. Under these conditions, the gain of the gas path may be defined as:

$$\text{gain} = \frac{(\text{change of gas flow})/(\text{full scale flow range})}{(\text{change of valve drive})/(\text{Max valve drive})} \quad \text{(Equation 5)}$$

To operate this same mass flow controller on gas "x" with a new full-scale flow range, the closed-loop gain of the mass flow controller 100 may be expected to change as follows:

$$\frac{\text{new gain on gas } x}{\text{old gain on } N_2} = \left(\frac{1}{Cfc_x}\right)^{0.4} \left(\frac{Mw_{N2}}{Mw_x}\right)^{0.2} \left(\frac{\text{old } N_2 \text{ range}}{\text{new } N_2 \text{ range}}\right) \quad \text{(equation 6)}$$

where $Cfc_x$=conversion factor "C" for gas x
Mw=molecular weight of gas

The above equation is approximate, as there is an additional term which is a function of inlet pressure, temperature, and the ratio of specific heats. However, the effect of this additional term is to the 0.4 power and can normally be neglected. For example, assuming that the calibration of the mass flow controller 100 was initially performed with Nitrogen as the known fluid or gas, the value of this additional term ranges from 0.684 for Nitrogen and other diatomic gases, up to 0.726 for monatomic gases, and down to 0.628 for polyatomic gases, then raised to the 0.4 power. Thus, the difference from Nitrogen is at most about 3.5% and may ordinarily be neglected. To compensate for the above change in gain with a different gas and or different operating conditions than those used in calibration, the gain term G may be changed by the inverse of the above ratio to provide a constant closed-loop gain for the mass flow controller, irrespective of set point, irrespective of operating conditions, and irrespective of the type of fluid or gas that is used. That is, if the closed-loop gain of the mass flow controller is A*B*C*D, then the gain term G is set to a constant time 1/(A*C*D) to provide a constant closed-loop gain that is the same as that used during calibration.

Having described several embodiments of the invention in detail, various modifications and improvements will readily occur to those skilled in the art. Such modifications and improvements are intended to be within the scope of the invention. Accordingly, the foregoing description is by way of example only, and is not intended as limiting. The invention is limited only as defined by the following claims and the equivalents thereto.

What is claimed is:

1. A method of configuring a mass flow controller for operation with process operating conditions that differ at least in part from test operating conditions used during production of the mass flow controller, the method comprising acts of:
    obtaining configuration data during operation of the mass flow controller with the test operating conditions having a test fluid;
    setting at least one control parameter based on the configuration data to facilitate establishing a dynamic response of the mass flow controller with the test operating conditions; and
    modifying the at least one control parameter based on the process operating conditions and the configuration data such that the dynamic response of the mass flow controller operating with the process operating conditions does not substantially change;
    wherein the act of modifying includes an act of determining at least one gain term associated with at least one of a plurality of individual components of the mass flow controller based on the process operating conditions;
    wherein the plurality of individual components includes a valve, and wherein the act of determining the at least one gain term includes determining at least one gain term from a physical model of the valve; and
    wherein the act of determining at least one gain term from a physical model of the valve includes determining a valve gain term as a change in fluid flow divided by a corresponding change in valve displacement at a plurality of predetermined flow rates.

2. The method of claim 1, wherein the process operating conditions include a process fluid different than the test fluid and wherein the act of modifying the at least one control parameter includes an act of modifying at least one control parameter based at least in part on process fluid species information.

3. The method of claim 1, wherein the act of modifying the at least one control parameter includes an act of determining a plurality of process gain terms associated with the plurality of individual components of the mass flow controller based on the process operating conditions, the plurality of individual components forming a control loop of the mass flow controller.

4. The method of claim 3, wherein the act of modifying the at least one control parameter further includes an act of determining a process reciprocal gain term formed by taking a reciprocal of a product of the plurality of process gain terms, the process reciprocal gain term being a function of at least one variable operating condition.

5. The method of claim 4, wherein the act of modifying the at least one control parameter includes an act of modifying at least one control parameter to equal the process reciprocal gain term such that the control loop has a constant loop gain with respect to at least the at least one variable operating condition.

6. The method of claim 1, wherein the act of setting at least one control parameter further includes an act of setting at least one control parameter to facilitate establishing a steady-state response of the mass flow controller with the test fluid under the test operating conditions.

7. A method of configuring a mass flow controller for operation with process operating conditions that differ at least in part from test operating conditions used during production of the mass flow controller, the method comprising acts of:
    obtaining configuration data during operation of the mass flow controller with the test operating conditions having a test fluid;
    setting at least one control parameter based on the configuration data to facilitate establishing a dynamic response of the mass flow controller with the test operating conditions; and
    modifying the at least one control parameter based on the process operating conditions and the configuration data such that the dynamic response of the mass flow controller operating with the process operating conditions does not substantially change;
    wherein the act of modifying the at least one control parameter includes an act of determining at least one gain term associated with at least one of a plurality of individual components of the mass flow controller based on the process operating conditions and an act of determining a reciprocal gain term formed by taking a reciprocal of a product of the at least one gain term;
    wherein the plurality of individual components includes a valve, and wherein the act of determining the at least one gain term includes determining at least one gain term from a physical model of the valve; and
    wherein the act of determining at least one gain term from a physical model of the valve includes determining a valve gain term as a change in fluid flow divided by a corresponding change in valve displacement at a plurality of predetermined flow rates.

8. The method of claim 7, wherein the act of determining at least one gain term includes determining a valve actuator gain term associated with a valve actuator from the valve gain term, the valve actuator gain term related to drive level as a function of valve displacement.

9. A method of configuring a mass flow controller for operation with process operating conditions that differ at least in part from test operating conditions used during production of the mass flow controller, the method comprising acts of:
    obtaining configuration data during operation of the mass flow controller with the test operating conditions having a test fluid;

setting at least one control parameter based on the configuration data to facilitate establishing a dynamic response of the mass flow controller with the test operating conditions; and modifying the at least one control parameter based on the process operating conditions and the configuration data such that the dynamic response of the mass flow controller operating with the process operating conditions does not substantially change;

wherein the act of setting at least one control parameter includes an act of setting at least one control parameter to facilitate establishing a steady-state response of the mass flow controller with the test fluid under the test operating conditions;

wherein the mass flow controller has a plurality of individual components including a flow meter, a valve, and a valve actuator;

wherein the act of obtaining the configuration data includes an act of obtaining at least one of sensor tuning data relating to a dynamic response of the flow meter, valve characterization data relating to a response of the valve and the valve actuator, and calibration data relating to a steady-state response of the mass flow controller with the test fluid under the test operating conditions;

wherein the act of obtaining the configuration data further includes an act of determining a first composite gain term including a gain term associated with the flow meter of the mass flow controller operating with the test fluid under the test operating conditions;

wherein the act of setting at least one control parameter includes setting a first control parameter to adjust the gain term associated with the flow meter to essentially a constant to facilitate establishing the steady-state response and setting a second control parameter based on a reciprocal of the first composite gain term to facilitate establishing the dynamic response;

wherein the act of modifying the at least one control parameter includes an act of determining a second composite gain term associated with the plurality of individual components of the mass flow controller based on the process operating conditions and the first composite gain term; and wherein the act of determining the second composite gain term includes acts of:

decomposing the first composite gain term into component gain terms including a test valve gain term;

determining a process valve gain term from the test valve gain term and the process operating conditions; and determining the second composite gain term based on the process valve gain term.

10. The method of claim 9, wherein the act of modifying at least one control parameter includes an act of modifying the first control parameter to equal a reciprocal of the second composite gain term.

11. The method of claim 9, wherein the act of determining the process valve gain term includes determining valve displacement as a function of flow rate from a physical model of the valve.

12. The method of claim 11, wherein the act of determining the second composite gain term includes acts of:

determining a process full scale range associated with a process fluid of the process operating conditions, the process fluid differing from the test fluid; and determining a process flow meter gain term based on the process full scale range; and modifying the second control parameter based on the process flow meter gain term.

13. The method of claim 12, wherein the act of determining valve displacement as a function of flow rate from a physical model includes applying process operating conditions including a process fluid to the physical model of the valve as parameters.

14. The method of claim 12, wherein the act of determining the second composite gain term includes determining a process valve actuator gain term associated with the valve actuator by determining drive level as a function of valve displacement based on the physical model of the valve.

15. The method of claim 12, wherein the second composite gain term is formed from the process flow meter gain term, the process valve actuator gain term and the process valve gain term such that it is a function of flow rate as indicated by a set point of the mass flow controller operating with the process operating conditions; and wherein the act of modifying the first control parameter includes an act of applying a reciprocal of the second composite gain term to a control loop including the plurality of individual components of the mass flow controller such that the control loop gain is constant with respect to set point.

16. A computer readable medium encoded with a program for execution on a processor, the program, when executed on the processor performing a method of configuring a mass flow controller for operation with process operating conditions that differ at least in part from test operating conditions used to establish a dynamic response of the mass flow controller during production, the method comprising acts of:

receiving as an input at least one of process fluid species information and at least one process operating condition;

obtaining a first composite gain term determined during operation of the mass flow controller with the test operating conditions;

determining a second composite gain term based on the first composite gain term and the input;

modifying at least one control parameter of the mass flow controller based on the second composite gain term to facilitate maintaining essentially the same dynamic response; and accessing configuration data stored on the computer readable medium, the configuration data being obtained when the response of the mass flow controller was established with the test operating conditions;

wherein the act of accessing configuration data includes an act of determining at least one test gain term associated with at least one of a plurality of components of the mass flow controller operating with a test fluid under the test operating conditions;

wherein the act of accessing configuration data includes the act of obtaining the first composite gain term, and wherein the act of determining the second composite gain term includes an act of decomposing the first composite gain term into a plurality of test gain terms associated with the plurality of components of the mass flow controller, the plurality of test gain terms including a test valve gain term associated with a valve of the mass flow controller.

17. The computer readable medium of claim 16, wherein the act of modifying at least one control parameter includes an act of determining at least one process gain term associated with at least one of the plurality of components of the mass flow controller, the at least one process gain term including a process valve gain term determined from a physical model of the valve and based on the process operating conditions.

18. The computer readable medium of claim 17, wherein the act of determining at least one process gain term includes an act of determining a process flow meter gain term, a process valve actuator gain term, and the process valve gain term, and determining a process reciprocal gain term formed by taking a reciprocal of a product of the at least one process gain term.

19. The computer readable medium of claims 18, wherein the act of modifying at least one control parameter includes an act of modifying the at least one control parameter to equal the process reciprocal gain term.

20. The computer readable medium of claim 16, in combination with the mass flow controller, wherein the processor is included in the mass flow controller, wherein the program is stored in a memory of the mass flow controller that is coupled to the processor, wherein the input is an input of the mass flow controller that is coupled to the processor, wherein when the program is executed on the processor, the mass flow controller is configured for operation with process operating conditions received at the input, and wherein the configuration data is stored in the memory of the mass flow controller.

21. The computer readable medium of claim 16, in combination with a computer that includes the processor upon which the program is executed, the computer including a memory in which the configuration data obtained from the mass flow controller is stored.

22. A computer readable medium encoded with a program for execution on a processor, the program, when executed on the processor performing a method of configuring a mass flow controller for operation with process operating conditions that differ at least in part from test operating conditions used to establish a dynamic response of the mass flow controller during production, the method comprising acts of:

receiving as an input at least one of process fluid species information and at least one process operating condition;

obtaining a first composite gain term determined during operation of the mass flow controller with the test operating conditions;

determining a second composite gain term based on the first composite gain term and the input; and modifying at least one control parameter of the mass flow controller based on the second composite gain term to facilitate maintaining essentially the same dynamic response;

wherein the act of determining the at least one process gain term includes an act of determining a plurality of process gain terms associated, respectively, with a flow meter, a valve, and a valve actuator of the mass flow controller based on the process operating conditions.

23. The computer readable medium of claim 22, wherein the act of determining configuration data includes an act of determining a process full scale range associated with a process fluid of the process operating conditions, the process fluid differing from a test fluid of the test operating conditions.

24. The computer readable medium of claim 23, wherein the act of determining the plurality of process gain terms includes determining at least a process valve gain term associated with the valve from a physical model of the valve, the physical model of the valve being adapted to take the process operating conditions as parameters.

25. The computer readable medium of claim 24, wherein the act of determining at least a process valve gain term includes determining a process valve actuator gain term associated with the valve actuator from the physical model of the valve.

26. The computer readable medium of claim 23, wherein the act of determining a plurality of process gain terms includes an act of determining a process flow meter gain term based on the process full scale range.

27. The computer readable medium of claim 22, in combination with the mass flow controller, wherein the processor is included in the mass flow controller, wherein the program is stored in a memory of the mass flow controller that is coupled to the processor, wherein the input is an input of the mass flow controller that is coupled to the processor, and wherein when the program is executed on the processor, the mass flow controller is configured for operation with process operating conditions received at the input.

28. A method of configuring a mass flow controller for operation with process operating conditions that differ at least in part from test operating conditions used during production of the mass flow controller, the method comprising acts of:

obtaining configuration data during operation of the mass flow controller with the test operating conditions having a test fluid;

setting at least one control parameter based on the configuration data to facilitate establishing a dynamic response of the mass flow controller with the test operating conditions; and modifying the at least one control parameter based on the process operating conditions and the configuration data such that the dynamic response of the mass flow controller operating with the process operating conditions does not substantially change;

wherein the mass flow controller has a control loop that includes:

a flow meter that monitors an actual flow of fluid provided by the mass flow controller and provides a conditioned output signal, the flow meter having a first gain term;

a control section that receives a second input signal indicative of a desired flow of the fluid to be provided by the mass flow controller and provides a control signal, the control section having a second gain term that is a function of at least one variable operating condition;

a valve that permits fluid flow based on the displacement of one or more elements of the valve, the valve having a third gain term; and a valve actuator that receives the control signal and adjusts the displacement of one or more elements in the valve, the valve actuator having a fourth gain term; the method further comprising an act of configuring the mass flow controller to have a substantially constant control loop gain, wherein:

the act of obtaining configuration data includes an act of determining the first, third, and fourth gain terms with the test fluid using the test operating conditions;

the act of modifying at least one control parameter includes an act of predicting how the first, third, and fourth gain terms will change with at least one of a process fluid and the process operating conditions; and the act of modifying the at least one control parameter further includes an act of changing the second gain term to a constant times the reciprocal of the product of the first, third and fourth gain terms to provide the substantially constant control loop gain with respect to at least the at least one variable operating condition.

* * * * *